United States Patent
Ogino

(10) Patent No.: US 7,370,205 B2
(45) Date of Patent: May 6, 2008

(54) CONTENT DISTRIBUTION SYSTEM, CONTENT DISTRIBUTION METHOD AND TERMINAL DEVICE

(75) Inventor: Akira Ogino, Tokyo (JP)

(73) Assignee: Sony Corporation, Tokyo (JP)

( * ) Notice: Subject to any disclaimer, the term of this patent is extended or adjusted under 35 U.S.C. 154(b) by 832 days.

(21) Appl. No.: 10/629,082

(22) Filed: Jul. 29, 2003

(65) Prior Publication Data

US 2004/0107347 A1   Jun. 3, 2004

(30) Foreign Application Priority Data

Aug. 1, 2002  (JP)  ............................. 2002-225277

(51) Int. Cl.
*H04L 9/00* (2006.01)
*G06F 7/04* (2006.01)
*G06F 17/30* (2006.01)
*G06F 15/00* (2006.01)
*G06F 12/14* (2006.01)
*G09C 5/00* (2006.01)
*H04N 7/08* (2006.01)
*H04N 5/91* (2006.01)
*H04N 5/92* (2006.01)

(52) U.S. Cl. .................. 713/176; 713/168; 726/32

(58) Field of Classification Search ............... 713/176, 713/168; 726/32
See application file for complete search history.

(56) References Cited

U.S. PATENT DOCUMENTS 6,807,285 B1 * 10/2004 Iwamura .................... 713/176
7,216,368 B2 * 5/2007 Ishiguro .................... 726/32

2002/0012443 A1   1/2002   Rhoads

FOREIGN PATENT DOCUMENTS

| EP | 1 223 742 A1 | 7/2002 |
|---|---|---|
| JP | 11-7241 | 1/1999 |
| JP | 2000-163488 | 6/2000 |
| JP | 2000-163883 | 6/2000 |
| JP | 2001-51960 | 2/2001 |

(Continued)

OTHER PUBLICATIONS

Qiong Liu, Reihaneh Safavi-Naini, Nicholas Paul Sheppard, "Digital rights management for content distribution", Jan. 2003, Proceedings of the Australasian information security workshop conference on ACSW frontiers 2003—vol. 21 ACSW Frontiers '03, pp. 1-10.*

(Continued)

*Primary Examiner*—Matthew Smithers
*Assistant Examiner*—Courtney D. Fields
(74) *Attorney, Agent, or Firm*—Finnegan, Henderson, Farabow, Garrett & Dunner, L.L.P.

(57) ABSTRACT

A content distribution system, a content distribution method and a terminal device are capable of effectively preventing disadvantages of users who formally bought content. In the content system in which a distribution server and a terminal device are connected through a network, even content is taken out from a storage means of the terminal device to the outside later, the content always carries user identification information, so that even the user having the content distributes the content over the network illegally, the distributor of the content can be found with sure.

9 Claims, 13 Drawing Sheets

FOREIGN PATENT DOCUMENTS

| | | | |
|---|---|---|---|
| JP | 2002-112210 | | 4/2002 |
| JP | 2004328090 A | * | 11/2004 |
| WO | WO 01/17228 | | 3/2001 |

OTHER PUBLICATIONS

English Translation of JP 2004328090 A has been submitted on Dec. 7, 2007, pp. 1-21.*

Fumitada Takahashi, "Digital Signal Processing: Multimedia Era is Protected by Watermark, First part Major candidate for copyright protection technology Brilliant move for the protection against illegal use of copy right products Copy is restrained by watermark," Nikkei Electronics No. 683, Nikkei BP, Feb. 24, 1997, 99-107.

* cited by examiner

CONTENT DISTRIBUTION SYSTEM, CONTENT DISTRIBUTION METHOD AND TERMINAL DEVICE

BACKGROUND OF THE INVENTION

1. Field of the Invention

This invention relates to a content distribution system, a content distribution method and a terminal device, and more particularly, is suitably applied to a content distribution system using the Internet or the like.

2. Description of the Related Art

In a content distribution system of this kind, a distribution server distributes data (hereinafter, referred to as content) to a requesting user's personal terminal out of many personal terminals connected to the server through a network such as the Internet, the content composed of material data such as text, video and audio based on a scenario.

At this time, such a cipher system is generally adapted that the distribution server encrypts the content before transmission and the user's personal terminal is allowed to display the content only when it can decrypt the encrypted content received through the network.

In the content distribution system adapting such cipher system, however, a user views content after decryption, so that if the content stored on the hard disk or in an external memory of his/her personal terminal is taken out to the outside, or if the content is published over the network, the content can be illegally copied and it is difficult to prevent such data leakage.

Even if illegally-copied content or content which is illegally published over the network is detected, it is difficult to find a person which illegally obtained the content and to certify the identity of the content. Therefore, to prevent this illegal data leakage, some actions beyond legal regulations should be done.

In addition, because easy digital copy can create content which is completely the same as the original, what we can do is to strictly protect copyright. As a result, users should follow more strict usage rule than before, and more users who formally bought content are not satisfied with the rule.

SUMMARY OF THE INVENTION

In view of the foregoing, an object of this invention is to provide a content distribution system, a content distribution method and a terminal device which are able to effectively avoid disadvantages in the purchase of content.

The foregoing object and other objects of the invention have been achieved by the provision of a content distribution system in which a distribution server and a terminal device are connected through a network. The distribution server comprises an embedding means for embedding in content watermark information generated by performing prescribed spreading modulation on user identification information uniquely assigned to the terminal device and a storage definition flag of which the state is preset on the terminal device side, an encryption means for encrypting the content having the watermark information embedded therein, and a transmission means for transmitting the encrypted content to the terminal device through the network, and the terminal device comprises a reception means for receiving the encrypted content, an extraction means for extracting the user identification information and the storage definition flag by performing prescribed processing on the watermark information embedded in the content, a decryption means for decrypting the encrypted content depending on the existence of the user identification information, a judgement means for judging based on the state of the storage definition flag whether the decrypted content should be encrypted before being stored, and a storage means for storing the content having the watermark information embedded therein.

As a result, in this content distribution system, even the content is taken out to the outside from the storage means of the terminal device afterward, the content always carries the user identification information. Therefore, even if the user having the content distributes the content over the network illegally, the distributor of the content can be found with sure.

Further, in the present invention, in a content distribution method of a content distribution system in which a distribution server and a terminal device are connected through a network, the distribution server comprises a first step of embedding in content watermark information generated by performing prescribed spreading modulation on user identification information uniquely assigned to the terminal device and a storage definition flag of which the state is preset on the terminal device side, a second step of encrypting the content having the watermark information embedded therein, and a third step of sending the encrypted content to the terminal device through the network, and the terminal device comprises a fourth step of receiving the encrypted content, a fifth step of extracting the user identification information and the storage definition flag by performing prescribed processing on the watermark information embedded in the content, a sixth step of decrypting the encrypted content depending on the existence of the user identification information, a seventh step of judging based on the state of the storage definition flag whether the decrypted content should be encrypted before being stored, and an eighth step of storing the content having the watermark information embedded therein.

As a result, in this content distribution method, even the content is taken out to the outside from the storage means of the terminal device afterward, the content always carries the user identification information. Therefore, even if the user having the content distributes the content over the network illegally, the distributor of the content can be found with sure.

Still further, in a content distribution method of a content distribution system in which a distribution server and a terminal device are connected through a network, the distribution server comprises a first step of adding to content user identification information uniquely assigned to the terminal device and a storage definition flag of which the state is preset on the terminal device side, a second step of encrypting the content having the user identification information and the storage definition flag added thereto, and a third step of sending the encrypted content to the terminal device through the network, and the terminal device comprises a fourth step of receiving the encrypted content, a fifth step of extracting the user identification information and the storage definition flag from the content, a sixth step of decrypting the encrypted content depending on the existence of the user identification information, a seventh step of judging based on the validly of the user identification information whether to convert the user identification information into watermark information through prescribed spreading modulation and then to embed the watermark information in the content, an eighth step of judging based on the state of the storage definition flag whether the decrypted content should be encrypted before being stored, and a ninth step of storing the content having the watermark information embedded therein.

As a result, in this content distribution method, since the content always carries the user identification information even the content is taken out to the outside from the storage means of the terminal device afterward, if the user having the content distributes the content over the network illegally, the distributor of the content can be found with sure.

Still further, in the present invention, in a content distribution method of a content distribution system in which a distribution server and a terminal device are connected through a network, the distribution server comprises a first step of adding to content user identification information uniquely assigned to the terminal device and a storage definition flag of which the state is preset on the terminal device side, a second step of encrypting the content having the user identification information and the storage definition flag added thereto, and a third step of sending the encrypted content to the terminal device through the network, and the terminal device comprises a fourth step of receiving and storing the encrypted content in a prescribed storage means, a fifth step of extracting the user identification information and the storage definition flag from the content when the content is read from the storage means as required, a sixth step of decrypting the encrypted content depending on the existence of the user identification information, a seventh step of converting the user identification information into watermark information through prescribed spreading modulation and embedding the watermark information in the decrypted content, and an eighth step of storing the content having the watermark information embedded therein, in the storage means.

As a result, in this content distribution method, the content always carries the user identification information even the content is taken out to the outside from the storage means afterward. Therefore, even if the user having the content distributes the content over the network illegally, the distributor of the content can be found with sure.

Still further, in the present invention, a terminal device controlling content comprises an extraction means for, in the case where watermark information generated by performing prescribed spreading modulation on user identification information uniquely assigned to the terminal device and a storage definition flag of which the state is preset on the terminal device side is embedded in content, extracting the user identification information and the storage definition flag by performing prescribed processing on the watermark information embedded in the content, a decryption means for, in the case where the content has been encrypted, decrypting the encrypted content depending on the existence of the user identification information, a judgement means for judging based on the state of the storage definition flag whether the decrypted content should be encrypted before being stored, and a storage means for storing the content having the watermark information embedded therein.

As a result, even the content is taken out to the outside from the storage means afterward, the content always carries the user identification information. Therefore, if the user having the content distributes the content over the network illegally, the distributor of the content can be found with sure.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
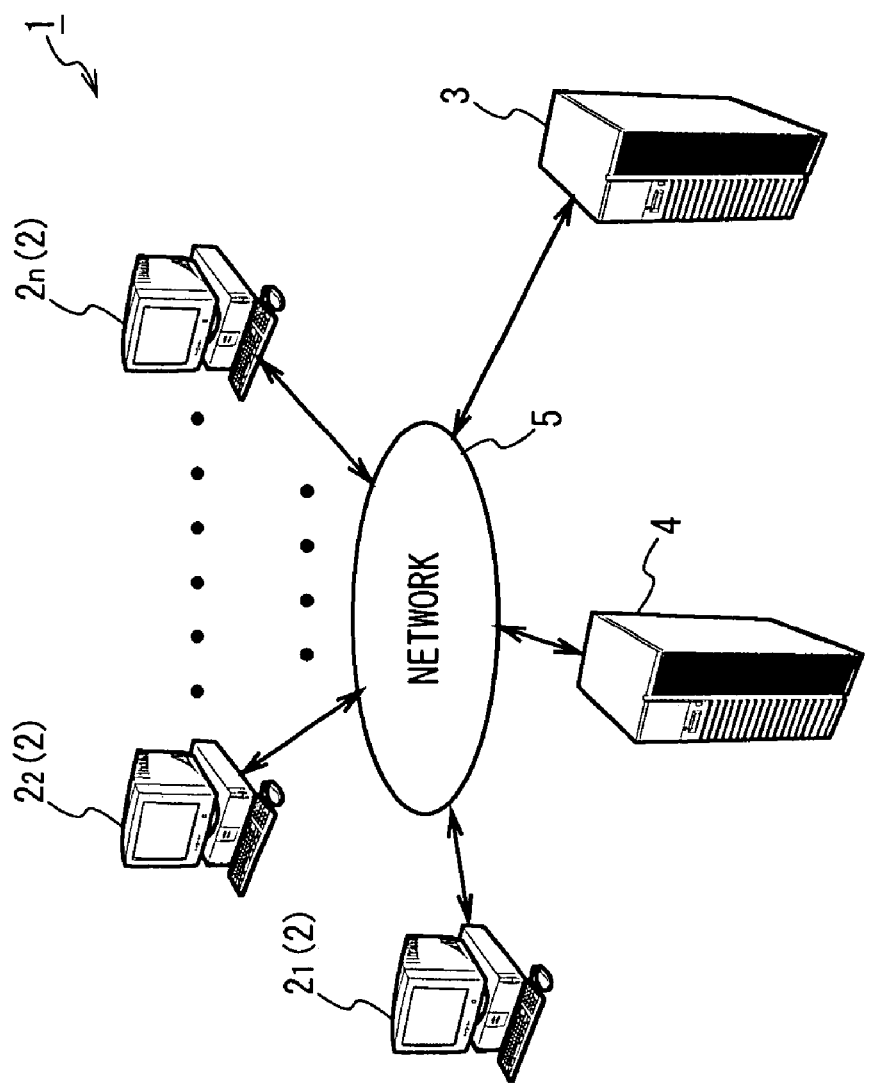
FIG. 1 is a schematic diagram showing the construction of a content distribution system of the first embodiment.

Preferred embodiments of this invention will be described with reference to the accompanying drawings:

(1) First Embodiment (1-1) Entire Construction of Content Distribution System According to the First Embodiment In FIG. 1, reference numeral 1 shows a content distribution system of the present invention. This system is constructed by connecting through a network 5 a plurality of users' personal terminals 2 ($2_1$-$2_n$), and a distribution server 3 and a management server 4 installed by a service provider.

Each personal terminal 2 is a general personal computer installed in a house or company, and is able to communicate with another personal terminal 2 and the distribution server 3 through the network 5 for data communication and to display Web pages based on screen data obtained through the communication.

The distribution server 3, on the other hand, is a Web server and database server for performing various processing relating to various services, as described later, provided by the service provider, and is able to communicate with a personal terminal 2 accessing through the network 5, for content communication.

As to the management server 4, the service provider checks content on the network sent from the personal terminals 2 to see if there is any copyright-infringing content, and when it detects copyright-infringing content, the management server 4 sends a warning through the network to the personal terminal which distributed the content.

(1-2) Construction of Distribution Server

Figure 2:
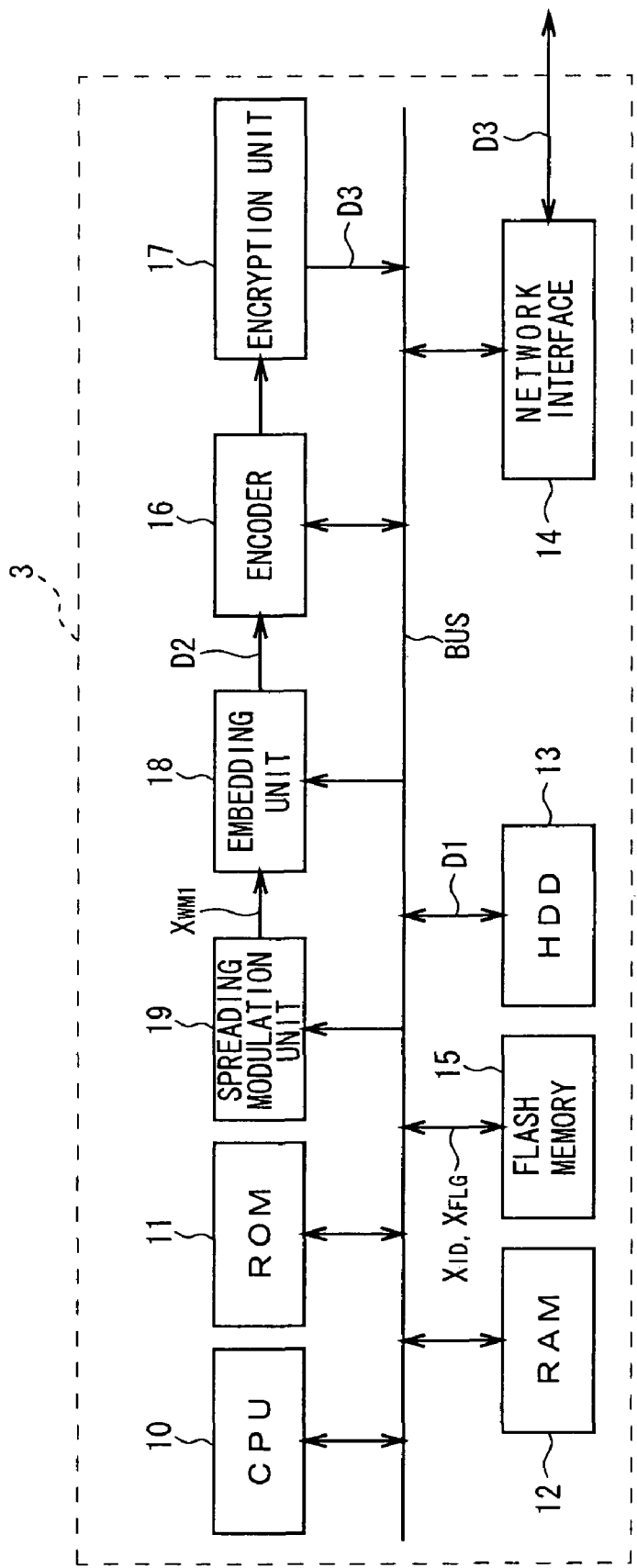
FIG. 2 is a block diagram showing the internal construction of the distribution server shown in FIG. 1.

FIG. 2 shows the construction of the distribution server 3. As apparent from FIG. 2, the distribution server 3 is constructed by connecting with a bus BUS a central processing unit (CPU) 10 for controlling the entire operation of the distribution server 3, a read only memory (ROM) 11 storing various software, a random access memory (RAM) 12 serving as a work memory of the CPU 10, a hard disk device (HDD) 13 storing various data and various content, a network interface 14 as an interface enabling the CPU 10 to communicate with the outside through the network 5 (FIG. 1), a flash memory 15, an encoder 16 for performing audio compression processing under, for example, adaptive transform acoustic coding 3 (ATRAC3) on content when the content composed of audio information is read from the HDD 13, and an encryption unit 17 for performing encryption processing under public-key infrastructure (PKI) or the like on compression-encoded content.

In addition to the above structure, the distribution server 3 has a spreading modulation unit 19 for performing prescribed spreading modulation (spread spectrum modulation, for example) on various information read from the flash memory 15, and an embedding unit 18 for embedding watermark information, described later, given from the spreading modulation unit 19 in content given from the HDD 13. The content having the watermark information embedded therein is given to the encoder 16 and then to the encryption unit 17.

First, the CPU 10 takes in data or commands from a personal terminal 2 accessing through the network 5 (FIG. 1), via the network interface 14, and performs various processing based on the data or commands and software stored in the ROM 11.

Then, as a result of the processing, the CPU 10 sends prescribed content or data, such as other programs or commands, read from the HDD 13, to the corresponding personal terminal 2 via the network interface 14 after encrypting it according to necessity.

As described above, the distribution server 3 can communicate content or other necessary data with the accessing personal terminal 2. It should be noted that the HDD 13 of the distribution server 3 stores a plurality of databases (not shown), so as to read necessary information from corresponding databases when performing various processing.

(1-3) Construction of Personal Terminal

Figure 3:
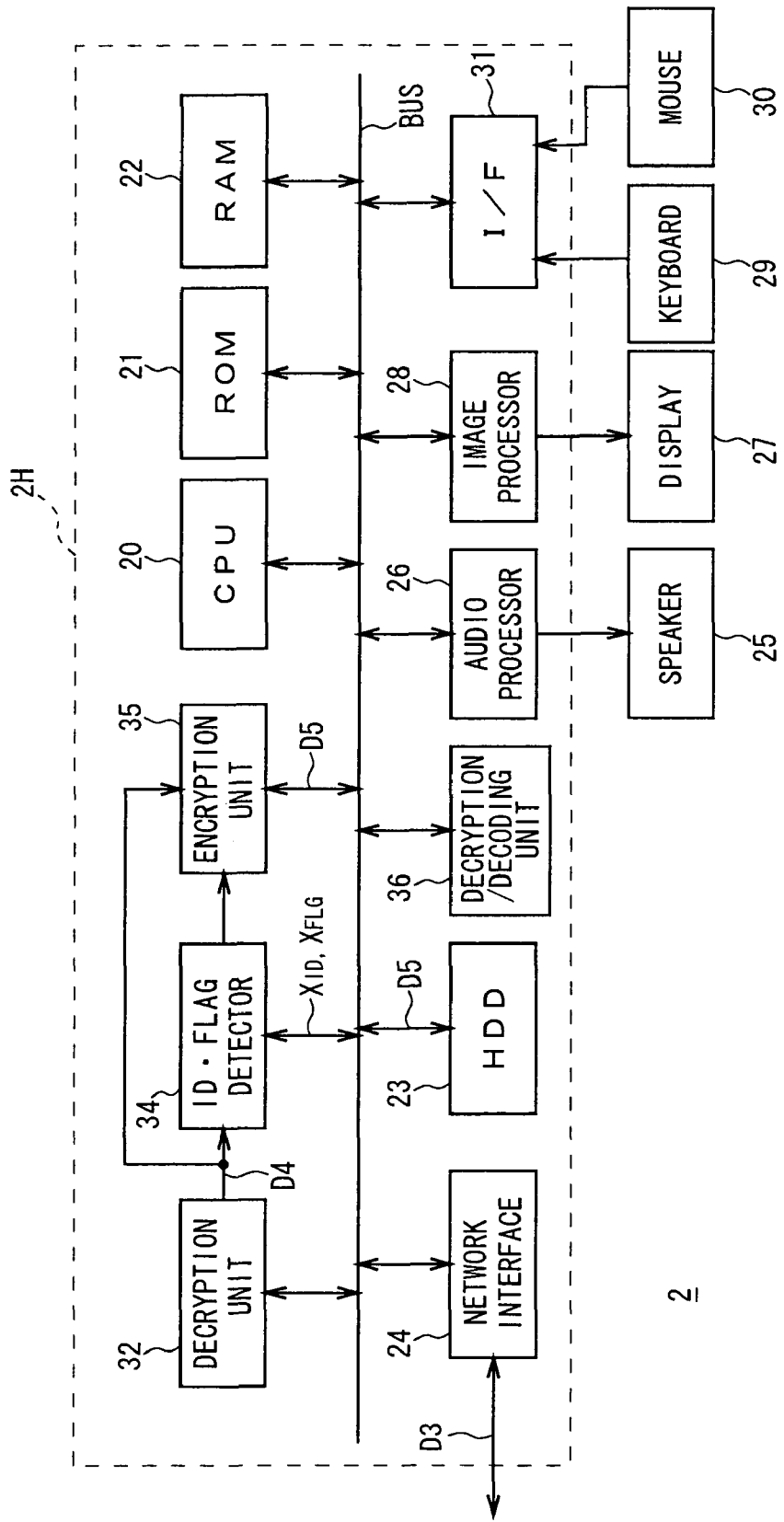
FIG. 3 is a block diagram showing the internal construction of the personal terminal shown in FIG. 1.

FIG. 3 shows the internal construction of the main section 2H of the personal terminal 2. The main section 2H of the personal terminal 2 is constructed by connecting with a bus BUS to each other a CPU 20 for controlling the entire operation of the personal terminal, a ROM 21 storing various software, a RAM 22 serving as a work memory of the CPU 20, a HDD 23 storing various data, a network interface 24 enabling the CPU 20 to communicate with the outside via the network 5 (FIG. 1), an audio processor 26 connected to a speaker 25, an image processor 28 connected to a display 27, an interface 31 connected to a keyboard 29 and a mouse 30, and a decryption unit 32 for decrypting encrypted content given via the network interface 24.

In addition to the above units, the main body 2H of the personal terminal 2 has an ID•flag detector 34 for detecting watermark information embedded in content decrypted by the decryption unit 32, an encryption unit 35 for encrypting content depending on the detected result of the ID•flag detector 32, and a decryption/decoding unit 36 for performing, if necessary, decryption processing and restoring the original content from compressed content.

First, the CPU 20 takes in via the network interface 24 data or commands given from the distribution server 3 or another personal terminal 2 accessing through the network 5 (FIG. 1), carries out various processing based on the data or commands, and software stored in the ROM 21.

As a result of the processing, the CPU 20 sends, for example, prescribed content or data such as other programs or commands, read from the HDD 23, to the distribution server 3 or the corresponding personal terminal 2 via the network interface 24.

As described above, the personal terminal 2 can communicate content and other necessary data with the distribution server 3 or another personal terminal accessing. It should be noted that the HDD 23 of the personal terminal 2 stores a plurality of databases (not shown), so as to read necessary information from corresponding databases when performing various processing.

(1-4) Construction of Management Server

Figure 4:
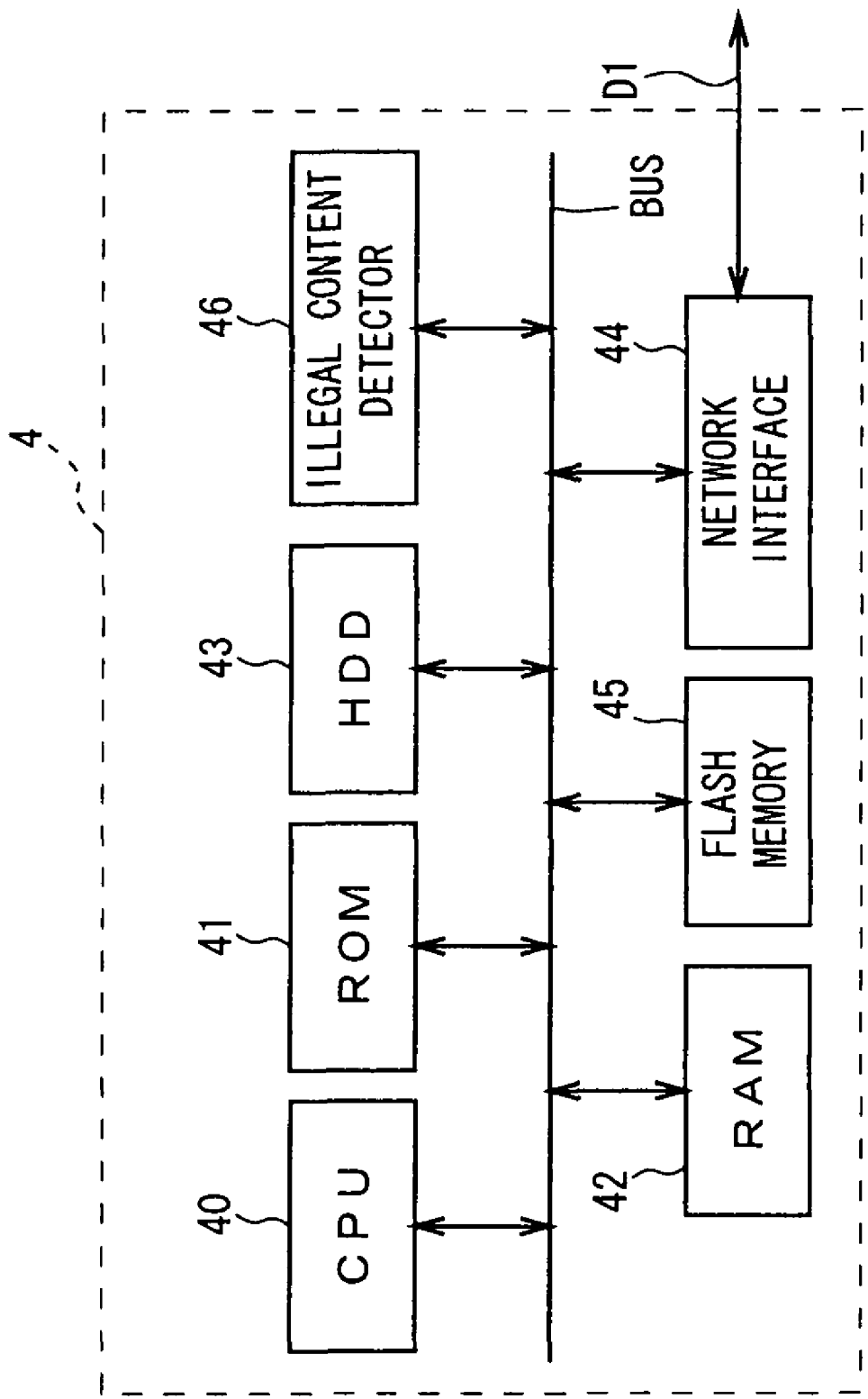
FIG. 4 is a block diagram showing the internal construction of the management server shown in FIG. 1.

FIG. 4 shows the construction of the management server 4. This management server 4 is constructed by connecting with a bus BUS to each other a CPU 40 for controlling the entire operation of the management server 4, a ROM 41 storing various software, a RAM 42 serving as a work memory of the CPU 40, a HDD 43 storing various data and various content, a network interface 44 enabling the CPU 40 to communicate with the outside through the network 5 (FIG. 1), a flash memory 45, and an illegal content detector 46 for detecting illegal content by checking content on the network 5.

The HDD 43 of this management server 4 stores databases (not shown) having user identification information $X_{ID}$ uniquely assigned to each personal terminal 2 formally registered in the distribution server 3.

The illegal content detector 46 uses file sharing software such as WinMX or Gnutella to obtain content distributed from the personal terminals 2 by monitoring the network 5 (FIG. 1).

The illegal content detector 46 detects the user identification information $X_{ID}$ included in the obtained content, to judge if the distributor of the content matches the user identification information $X_{ID}$ on the personal terminal 2 of a user formally registered. Then, the illegal content detector 46 makes prescribed notification or warning to the personal terminal 2 which distributed the content, regardless of the result, match or unmatch.

(1-5) Content Distribution from Distribution Server to Personal Terminal

When a personal terminal 2 actually accesses the distribution server 3 in this content distribution system 1, the CPU 10 of the distribution server 3 shown in FIG. 2 retrieves user identification information (ID) $X_{ID}$ assigned to the user of the personal terminal 2 and a prescribed judgement flag (hereinafter, referred to as storage definition flag) $X_{FLG}$ provided together with the user identification information $X_{ID}$, from the flash memory 15.

This storage definition flag $X_{FLG}$ is a flag indicating if the content should be encrypted before being stored on the HDD 23 of the user's personal terminal 2, and is preset to be up or down by the user.

Then, the CPU 10 of the distributions server 3 sends the user identification information $X_{ID}$ and the storage definition flag $X_{FLG}$ to the spreading modulation unit 19. The spreading modulation unit 19 performs prescribed spreading modulation on the user identification information $X_{ID}$ and the storage definition flag $X_{FLG}$, so as to generate watermark information $X_{WM1}$.

This watermark information $X_{WM1}$ is a kind of copyright information to be embedded in a redundant part of content with a technique called "digital watermark", and the embedding part is determined according to the kind of content.

In a case where content is composed of audio information, for example, the watermark information $X_{WM1}$ is embedded as a noise in an unimportant part of the content which people can not hear, with utilizing the hearing characteristics of human in which weak sounds existing within several tens of milliseconds before and after strong sounds are deadened by the strong sounds.

Then, the CPU 10 of the distribution server 3 controls the embedding unit 18 to embed the watermark information $X_{WM1}$ in user desired content D1 retrieved from the HDD 13, so as to generate synthesized information data D2.

Specifically, the synthesized information data D2 is generated by sampling audio information being the content D1 with a prescribed sampling frequency (for example, 44.1 kHz) with the aforementioned digital watermark technique, searching for lower bits, and then embedding the watermark information $X_{WM1}$ in the lower bits, or by analyzing the waveform of the content D1 being audio information using Fourier transformation or wavelet transformation and then embedding the watermark information $X_{WM1}$ in a specific frequency component.

Sequentially, the CPU 10 of the distribution server 3 controls the embedding unit 18 to send the obtained synthesized information data D2 to the encoder 16 to compression-encode it, and then controls the encryption unit 17 to perform prescribed encryption (hereinafter, referred to as first encryption) on the compression-encoded data.

Then, the CPU 10 of the distribution server 3 sends the compressed information data (hereinafter, referred to as distribution content data) D3, which was encrypted by the encryption unit 17, via the network interface 14 to the corresponding personal terminal 2 connected on the network 5.

Figure 5:
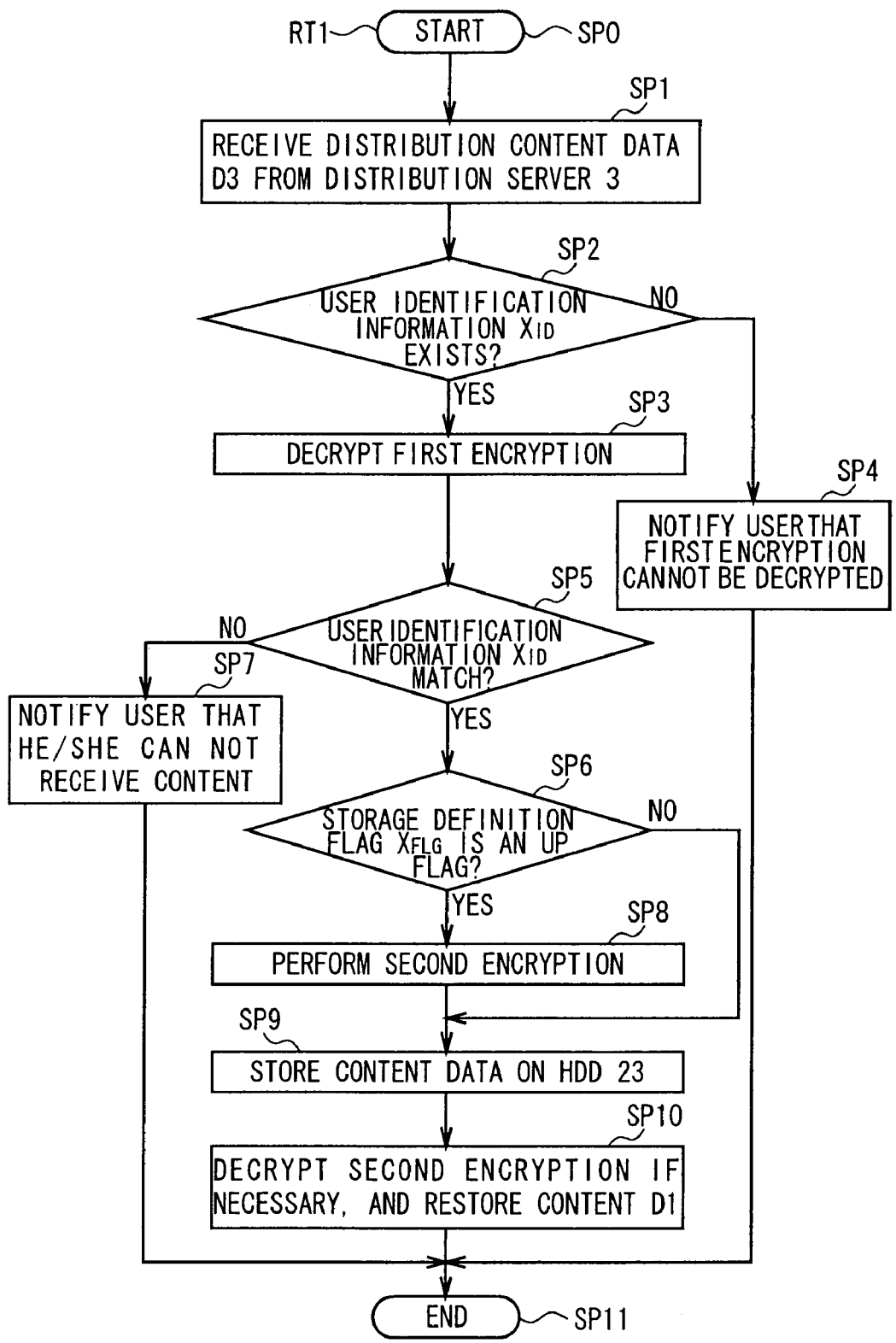
FIG. 5 is a flowchart explaining a content reception processing procedure according to the first embodiment.

On the other hand, in this content distribution system 1, the CPU 20 of the personal terminal shown in FIG. 3 carries out a content reception processing procedure RT1 shown in FIG. 5 starting with step SP0. The CPU 20 sends the distribution content data D3 sent from the distribution server 3 via the network 5 (FIG. 1), to the decryption unit 32 via the network interface 24 (step SP1).

At this time, the CPU 20 of the personal terminal 2 judges whether the distribution content data D3 includes the user identification information $X_{ID}$ (step SP2), and only when the user identification information $X_{ID}$ exists, it performs decryption processing for decrypting the aforementioned first encryption with the decryption unit 32 (step SP3).

When it is judged that the distribution content data D3 does not include the user identification information $X_{ID}$, the CPU 20 of the personal terminal 2 displays a message on the display 27 to let the user know that the first encryption is not allowed to be decrypted (step SP4).

After the decryption unit 32 performs the decryption, the CPU 20 of the personal terminal 2 sends the resultant distribution content data (hereinafter, referred to as compressed content data) D4 to both the ID•flag detector 34 and the encryption unit 35.

The ID•flag detector 34 performs despreading modulation processing on the watermark information $X_{WM1}$ embedded in the compressed content data D4, to extract the user identification information $X_{ID}$ and the storage definition flag $X_{FLG}$ from the watermark information $X_{WM1}$.

At this time, the CPU 20 of the personal terminal 2 retrieves the user identification information $X_{ID}$ assigned to the personal terminal 2, from the RAM 22 to judge if the user identification information $X_{ID}$ extracted by the ID•flag detector 34 matches the user identification information $X_{ID}$ retrieved (step SP5).

If an affirmative result is obtained, the CPU 20 of the personal terminal 2 judges if the storage definition flag $X_{FLG}$ extracted by the ID•flag detector 34 is an up flag or a down flag, to determine whether to encrypt the compressed content data D4 sent from the decryption unit 32 (step SP6).

If the user identification information $X_{ID}$ extracted does not match the user identification information $X_{ID}$ retrieved, the CPU 20 of the personal terminal 2 displays a message on the display 27 via the image processor 28 to let the user know that he/she can not receive the content (step SP7).

Only when the storage definition flag $X_{FLG}$ is an up flag, meaning that the data should be encrypted, the encryption unit 35 performs prescribed encryption (hereinafter, referred to as second encryption) on the compressed content data D4 given from the decryption unit 32 (step SP8). This encryption may be the same as the first encryption.

Sequentially, the CPU 20 of the personal terminal 2 stores the compressed content data D5 subjected to the second encryption by the encryption unit 35, on the HDD 23 (step SP9).

When the storage definition flag $X_{FLG}$ is a down flag, meaning that the data should not be encrypted, on the contrary, the CPU 20 of the personal terminal 2 stores the compressed content data D4 on the HDD 23 as it is (step SP9).

When the user makes a request for the content with the mouse or keyboard, the CPU 20 of the personal terminal 2 retrieves the corresponding compressed content data D4, D5 from the HDD 23 and sends it to the decryption/decoding unit 36.

The decryption/decoding unit 36 decrypts, if necessary, the second encryption of the compressed content data D4, D5, and then restores the original content D1 from the compressed content data D4 (step SP10).

Thus, the CPU 20 of the personal terminal 2 can provide the user with the original content D1 by outputting sounds based on the content D1 from the speaker 25 via the audio processor 26 (step SP11).

(1-6) Operation and Effects of the First Embodiment

In the aforementioned content distribution system 1, when the distribution server 3 receives an access request from a personal terminal 2, it retrieves and spreading-modulates the user identification information $X_{ID}$ and the storage definition flag $X_{FLG}$ for the user of the personal terminal 2 to generate watermark information $X_{WM1}$.

Then, the distribution server 3 embeds the watermark information $X_{WM1}$ in the specified content D1, performs the first encryption on the resultant content to thereby generate the distribution content data D3 which is then sent to the accessing personal terminal 2 via the network 5.

The personal terminal 2 decrypts the first encryption of the received distribution content data D3 on the condition that the data D3 includes the user identification information $X_{ID}$, and then extracts the user identification information $X_{ID}$ and the storage definition flag $X_{FLG}$ from the watermark information $X_{WM1}$ embedded in the compressed content data D4.

Then, the personal terminal 2 performs the second encryption on the compressed content data D4 having the watermark information $X_{WM1}$ embedded therein and then stores the resultant on the HDD 23 only when the extracted user identification information $X_{ID}$ matches the user identification information $X_{ID}$ assigned to the personal terminal 2 at the time of registration to the distribution server 3 and the storage definition flag $X_{FLG}$ is an up flag.

As described above, when the personal terminal 2 receives content from the distribution server 3 via the network 5, it stores the content on the HDD 23 with the user identification information $X_{ID}$ embedded therein as the watermark information $X_{WM1}$. Thus, when the content is taken out from the HDD 23 to the outside afterward, the content always includes the user identification information $X_{ID}$, so that it can be judged if the content was obtained legally or illegally.

In the aforementioned content distribution system 1, the distribution server 3 performs the first encryption on content having user identification information $X_{ID}$ and a storage definition flag $X_{FLG}$ embedded therein as watermark information and sends the resultant content to the accessing personal terminal 2 via the network. The personal terminal 2 decrypts the first encryption of the received content only when the content includes the user identification information $X_{ID}$, and when the user identification information $X_{ID}$ is valid, stores the content on the HDD 23, after or without encryption depending on the state of the storage definition flag $X_{FLG}$. As a result, when the content is taken out from the HDD 23 to the outside afterward, the content always includes the user identification information $X_{ID}$, so that if the user having the content distributes the content over the network illegally, the distributor of the content can be found with sure, thus making it possible to realize the content distribution system 1 capable of effectively preventing disadvantages of users who formally bought content.

Figure 6:
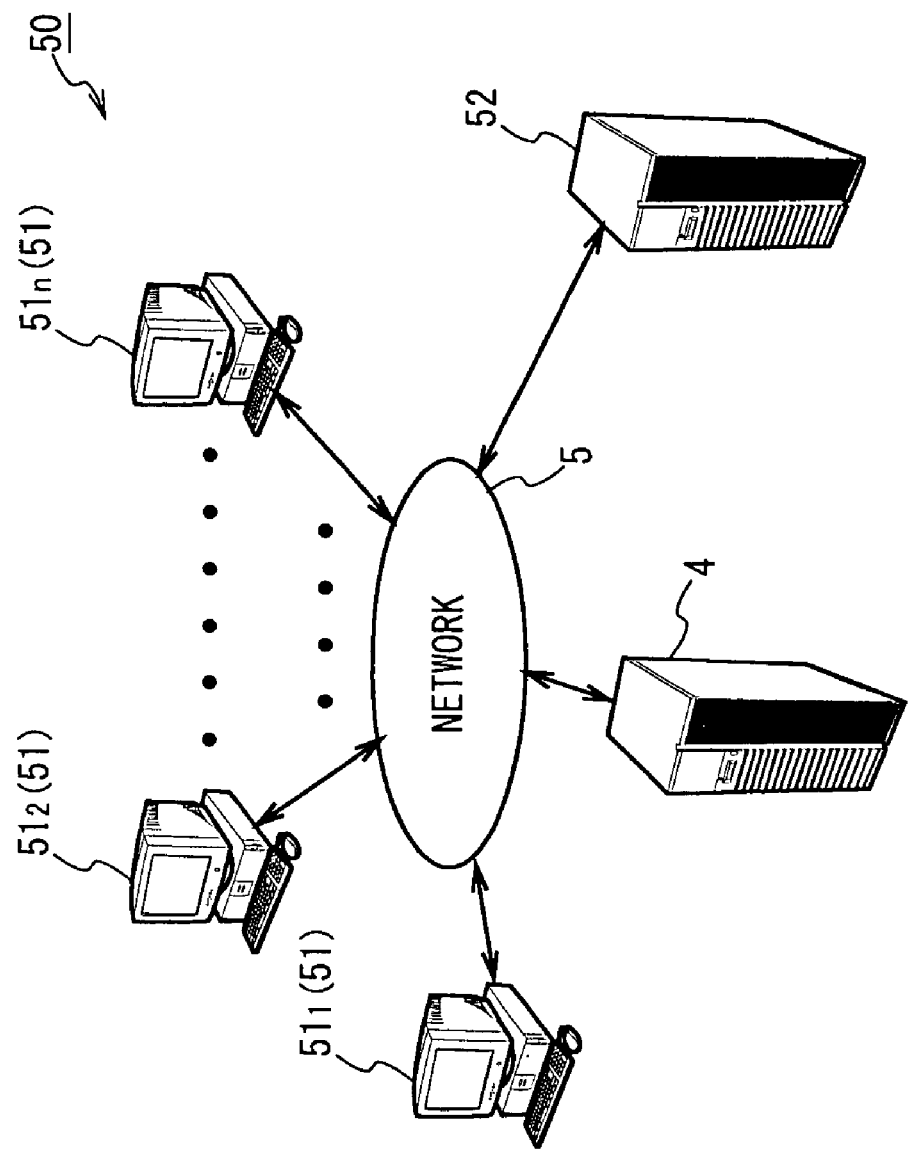
FIG. 6 is a schematic diagram showing the construction of a content distribution system of the second embodiment.

(2) Second Embodiment (2-1) Entire Construction of Content Distribution System According to Second Embodiment FIG. 6 shows a content distribution system 50 according to the second embodiment. The content distribution system 50 has the same construction as the content distribution system 1 of the first embodiment shown in FIG. 1, except for the constructions of personal terminals 51 ($51_1$-$51_n$) and distribution server 52.

Figure 7:
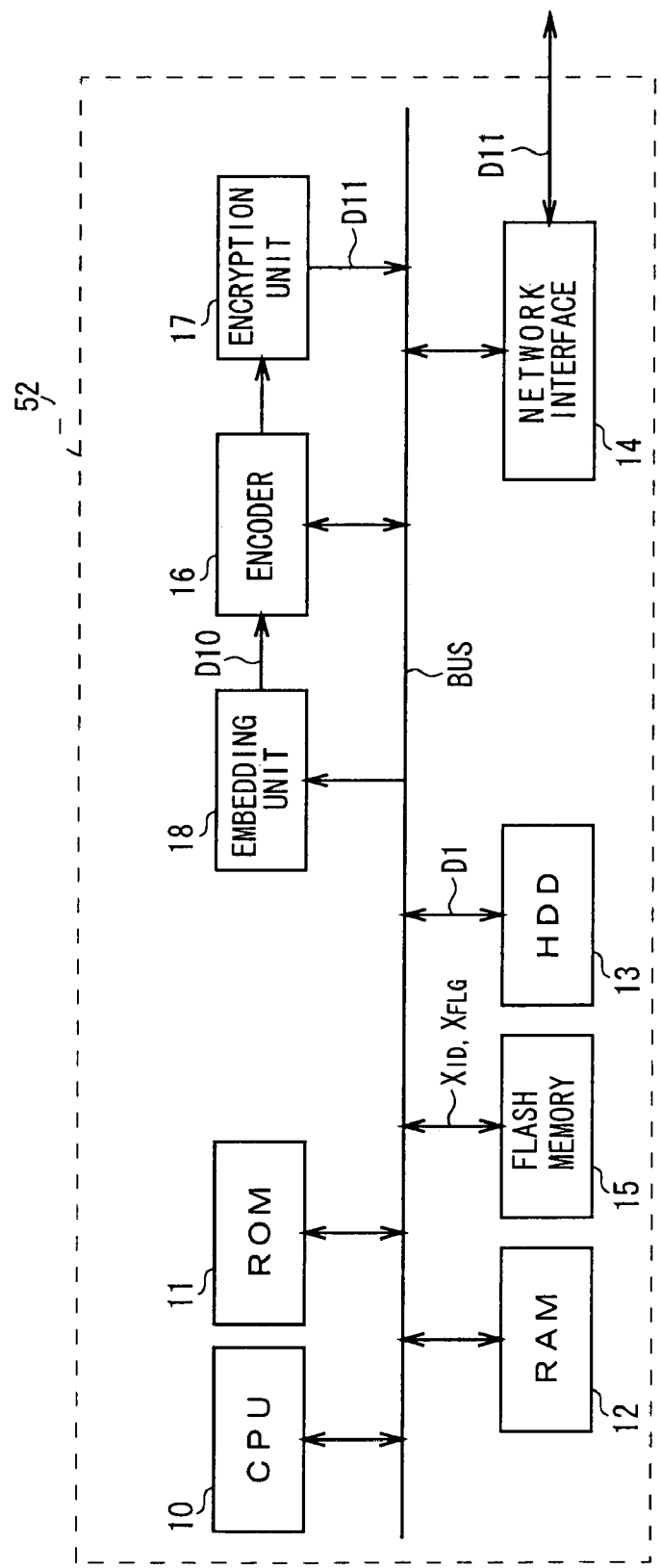
FIG. 7 is a block diagram showing the internal construction of the distribution server shown in FIG. 6.

(2-2) Constructions of Distribution Server and Personal Terminal According to Second Embodiment FIG. 7 shows the distribution server 52 according to the second embodiment, and the distribution server 52 has the same construction of the distribution server 3, except that there is no spreading modulation unit 19 (FIG. 2).

In this distribution server 52, an embedding unit 18 embeds user identification information $X_{ID}$ and a storage definition flag $X_{FLG}$ retrieved by a CPU 10 from a flash memory 15, in content D1 retrieved from the HDD 13, and then sends the resultant to an encoder 16 and then an encryption unit 17.

Figure 8:
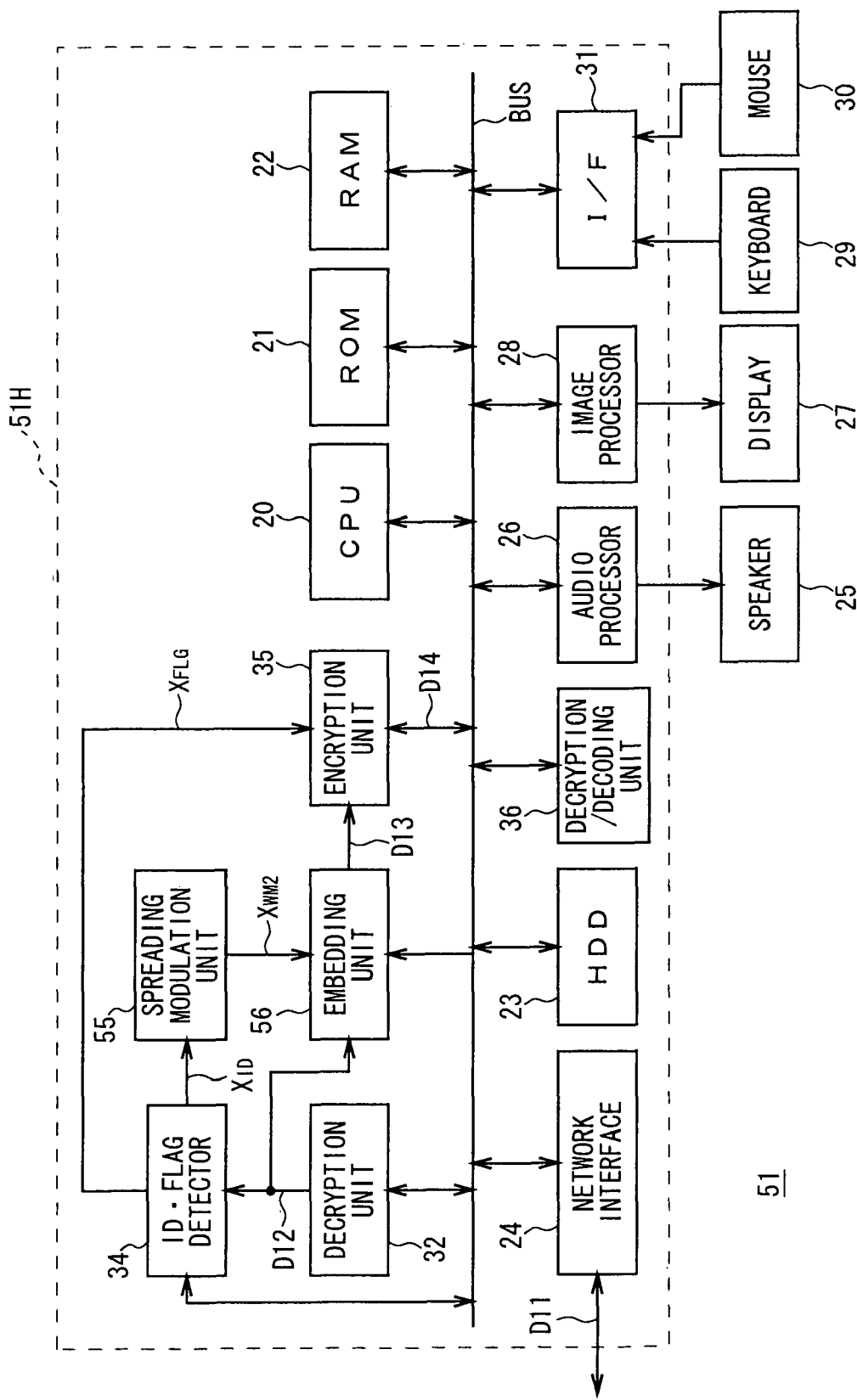
FIG. 8 is a block diagram showing the internal construction of the personal terminal shown in FIG. 6.

FIG. 8 shows a personal terminal 51 according to the second embodiment, and the personal terminal 51 has the same construction as the personal terminal 2 shown in FIG. 3, except that a main section 51H has a spreading modulation unit 55 and an embedding unit 56.

In this personal terminal 51, the spreading modulation unit 55 performs spreading modulation processing on user identification information $X_{ID}$ and a storage definition flag $X_{FLG}$ and the embedding unit 56 embeds the resultant in a redundant part of content, since the distribution server 52 (FIG. 7) does not embed the user identification information $X_{ID}$ and the storage definition flag $X_{FLG}$ in the content with the "digital watermark" technique.

(2-3) Content Distribution from Distribution Server to Personal Terminal

When the CPU 10 of the distribution server 52 shown in FIG. 7 actually receives an access request from a personal terminal 51 (FIG. 6), it retrieves user identification information $X_{ID}$ assigned to the user of the personal terminal 51 and a storage definition flag $X_{FLG}$ from the flash memory 15.

Then, the CPU 10 of the distribution server 52 controls the embedding unit 18 to embed the user identification information $X_{ID}$ and the storage definition flag $X_{FLG}$ in user desired content D1 retrieved from the HDD 13, to thereby generate synthesized information data D10.

Specifically, the synthesized information data D10 is generated by recording the user identification information $X_{ID}$ and the storage definition flag $X_{FLG}$ in the header of the data format of audio data composing the content D1, which is a different technique from the aforementioned digital watermark technique.

Then, the CPU 10 of the distribution server 52 controls the embedding unit 18 to send the synthesized information data D10 to the encoder 16 to compression-encode the data, and then controls the encryption unit 17 to perform the first encryption on the resultant data, so as to thereby generate distribution content data D11.

Then, the CPU 10 of the distribution server 52 sends the distribution content data D11 via a network interface 14 to the corresponding personal terminal 51 (FIG. 6) connected on the network 5.

Figure 9:
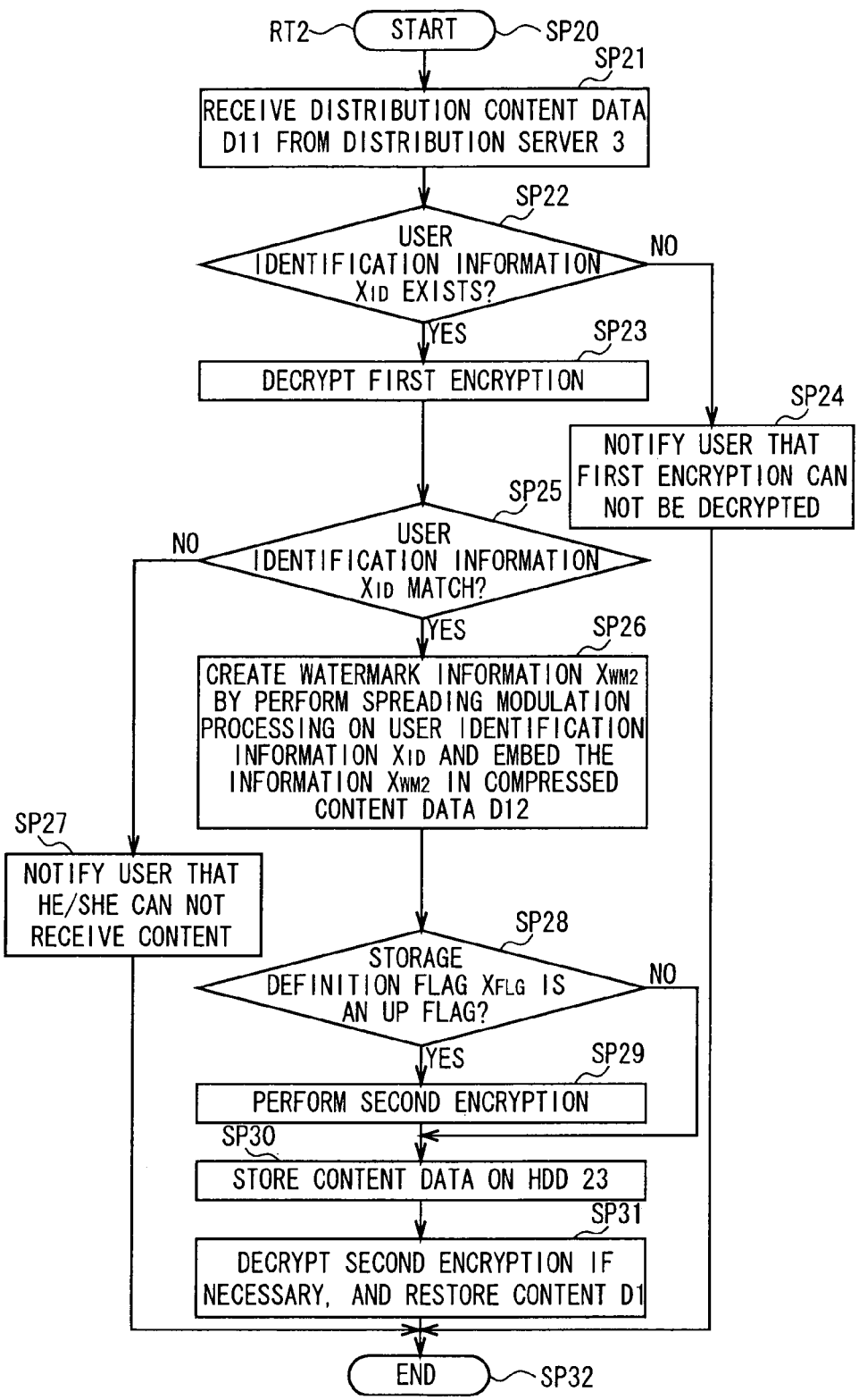
FIG. 9 is a flowchart explaining a content reception processing procedure according to the second embodiment.

The CPU 20 of the personal terminal 51 shown in FIG. 6, on the other hand, carries out a content reception processing procedure RT2 shown in FIG. 9 starting with step SP20, and sends the distribution content data D11, which was given from the distribution server 52 through the network 5 (FIG. 1), to a decryption unit 32 via a network interface 24 (step SP21).

At this time, the CPU 20 of the personal terminal 51 judges whether the distribution content data D11 has the user identification information $X_{ID}$ (step SP22), and decrypts the aforementioned first encryption of the data D11 at the decryption unit 32 only when the user identification information $X_{ID}$ exists (step SP23)

If it is judged that the distribution content data D11 does not include the user identification information $X_{ID}$, the CPU 20 of the personal terminal 51 displays a message on a display 27 via an image processor 28 to let the user know that the first encryption is not allowed to be decrypted (step SP24).

After the decryption unit 32 decrypts the first encryption, the CPU 20 of the personal terminal 51 sends the resultant compressed content data D12 to both an ID•flag detector 34 and the embedding unit 56.

The ID•flag 34 extracts the user identification information $X_{ID}$ and the storage definition flag $X_{FLG}$ from the compressed content data D12. At this time, the CPU 20 of the personal terminal 51 retrieves the user identification information $X_{ID}$ assigned to the personal terminal 51, from the RAM 22 to judge if this user identification information $X_{ID}$ matches the user identification information $X_{ID}$ extracted by the ID•flag detector 34 (step SP25).

If an affirmative result is obtained, the CPU 20 of the personal terminal 51 sends the user identification information $X_{ID}$ and the storage definition flag $X_{FLG}$, which were extracted by the ID•flag detector 34, to the spreading modulation unit 55 and an encryption unit 35, respectively (step SP26).

If a negative result is obtained, on the contrary, the CPU 20 of the personal terminal 51 displays a massage on the display 27 to let the user know that he/she can not receive the content (step SP27).

The spreading modulation unit 55 generates watermark information $X_{WM2}$ by performing prescribed spreading modulation processing on the user identification information $X_{ID}$ sent from the ID•flag detector 34. Then, the CPU 20 of the personal terminal 51 controls the embedding unit 56 to embed the watermark information $X_{WM2}$ in the compressed content data D12 sent from the decryption unit 32, so as to thereby generate synthesized compressed content data D13 (step SP26).

Sequentially, the CPU 20 of the personal terminal 51 detects whether the storage definition flag $X_{FLG}$ extracted by the ID•flag detector 34 is an up flag or down flag, to judge if the synthesized compressed content data D13 sent from the embedding unit 56 should be encrypted (step SP28).

Only when the storage definition flag $X_{FLG}$ is an up flag, meaning that the data should be encrypted, the encryption unit 35 performs second encryption on the synthesized compressed content data D13 (step SP29).

Then, the CPU 20 of the personal terminal 51 stores the synthesized compressed content data D14 subjected to the second encryption, on the HDD 23 (step SP30).

When the storage definition flag $X_{FLG}$ is a down flag, meaning that the data should not be encrypted, on the contrary, the encryption unit 35 stores the synthesized compressed content data D13 on the HDD 23 as it is (step SP30).

When the user makes a request for the content with a mouse 29 or keyboard 30 afterward, the CPU 20 of the personal terminal 51 retrieves the corresponding synthesized compressed content data D13, D14 from the HDD 23 and sends it to a decryption/decoding unit 36.

The decryption/decoding unit 36 decrypts, if necessary, the second encryption of the synthesized compressed content data D13, D14, and restores the original content D1 from the synthesized compressed content data D13 (step SP31).

Thus, the CPU 20 of the personal terminal 51 provides the user with the original content D1 by outputting sounds based on the content D1 from a speaker 25 via an audio processor 26 (step SP32).

(2-4) Operation and Effects of the Second Embodiment

In this content distribution system 50 having the aforementioned construction, when the distribution server 52 receives an access request from a personal terminal 51, it retrieves and embeds the user identification information $X_{ID}$ and the storage definition flag $X_{FLG}$ for the user of the personal terminal 51, in specified content D1, and performs the first encryption, to thereby generate distribution content data D11, and then sends the data D11 to the accessing personal terminal 51 via the network 5.

The personal terminal 51 decrypts the first encryption of the distribution content data D11 on the condition that the data D11 includes the user identification information $X_{ID}$, and then extracts the user identification information $X_{ID}$ and the storage definition flag $X_{FLG}$ from the compressed content data D12.

Sequentially, the personal terminal 51 performs spreading modulation on the user identification information $X_{ID}$ to generate watermark information $X_{WM2}$ and judges whether the storage definition flag $X_{FLG}$ is an up flag, only when the extracted user identification information $X_{ID}$ matches the user identification information $X_{ID}$, stored in the RAM 22, assigned to the personal terminal 51.

Then, only when the storage definition flag $X_{FLG}$ is an up flag, the personal terminal 51 embeds the watermark information $X_{WM2}$ in the compressed content data D12 to thereby generate the synthesized compressed content data D13, and performs the second encryption on the synthesized compressed content data D13 and stores the resultant on the HDD 23.

As described above, when the personal terminal 51 receives the content from the distribution server 52 via the network 5, it stores, on the condition that the user identification information $X_{ID}$ is valid, the content on the HDD 23 with the user identification information $X_{ID}$ embedded in the content as the watermark information $X_{WM2}$, after or without encryption depending on the state of the storage definition flag $X_{FLG}$. As a result, even the content is taken out from the HDD 23 to the outside afterward, the content always includes the user identification information $X_{ID}$, so that it can be judged whether the content was obtained illegally.

As described above, in the content distribution system 50, the distribution server 52 performs the first encryption on content having user identification information $X_{ID}$ embedded therein, and sends the resultant to the accessing personal terminal 2 through the network, and the personal terminal 2 decrypts the first encryption of the received content only when the content includes the user identification information $X_{ID}$, and then only when the user identification information $X_{ID}$, is valid, it stores the content on the HDD 23 with the user identification information $X_{ID}$ embedded in the content as watermark information $X_{WM2}$, after or without encryption depending on the state of the storage definition flag $X_{FLG}$. As a result, even the content is taken out from the HDD 23 to the outside afterward, the content always includes the user identification information $X_{ID}$, so that even the user having the content distributes the content over the network illegally, the distributor of the content can be found with sure, thus making it possible to realize the content distribution system 50 capable of effectively prevent disadvantages of users who formally bought content.

(3) Third Embodiment (3-1) Construction of Content Distribution System According to Third Embodiment A content distribution system (not shown) according to the third embodiment has the same construction as the content distribution system 50 according to the second embodiment shown in FIG. 6, except for the constructions of personal terminals 60 ($60_1$-$60_n$).

Figure 10:
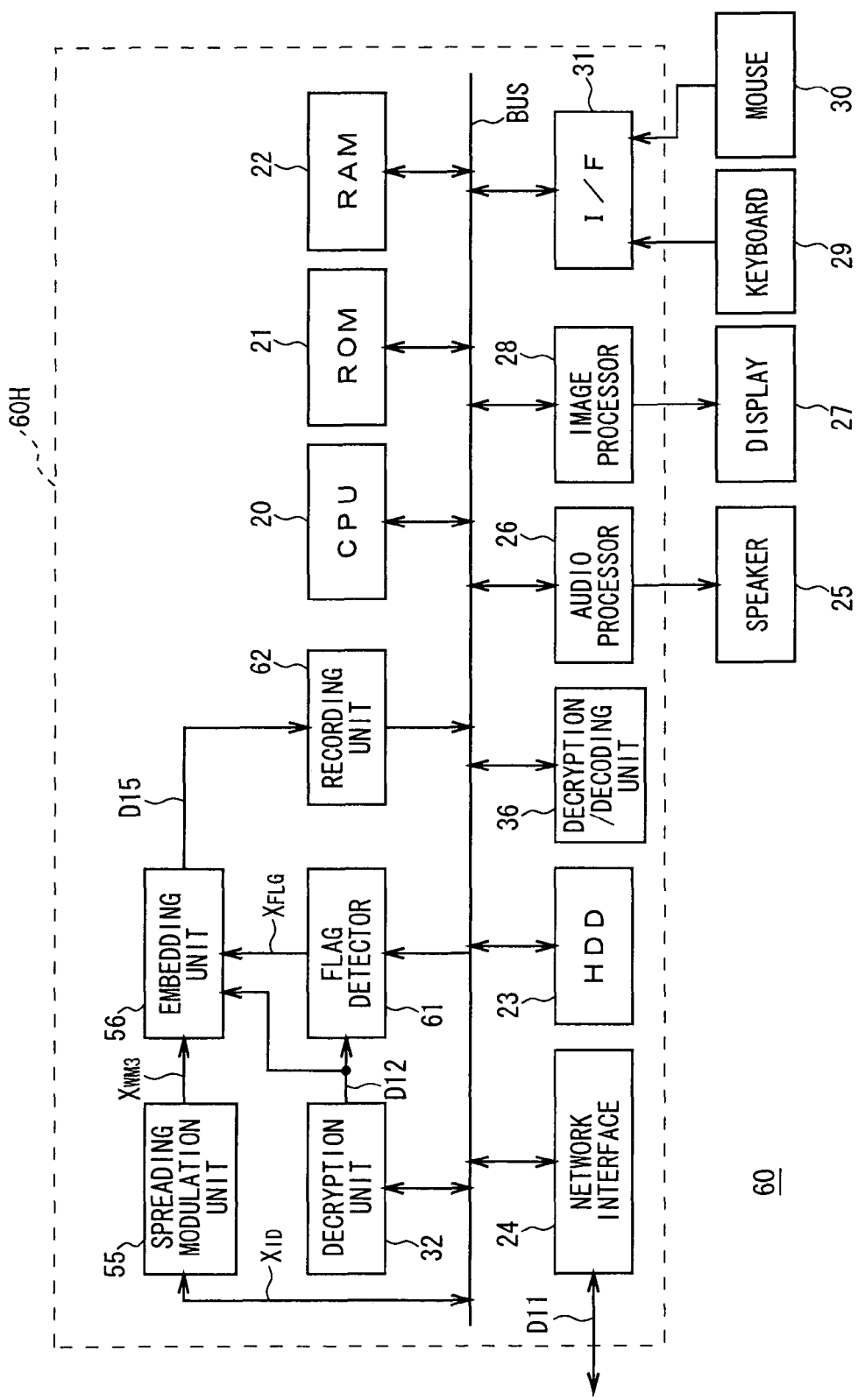
FIG. 10 is a block diagram showing the construction of a personal terminal of the third embodiment.

FIG. 10 shows the construction of a personal terminal 60 according to the third embodiment, and the personal terminal 60 has almost the same construction as the personal terminal 51 shown in FIG. 8, except that a main section 60H has a flag detector 61 and recording unit 62 instead of the ID•flag detector 34 and the encryption unit 35.

This personal terminal 60 stores content on an HDD in advance and then embeds user identification information $X_{ID}$ in the content read from the HDD, which is a different technique from the technique of the personal terminal 51 according to the second embodiment where content is stored after user identification information $X_{ID}$ is embedded therein.

(3-2) Content Distribution from Distribution Server to Personal Terminal

Figure 11:
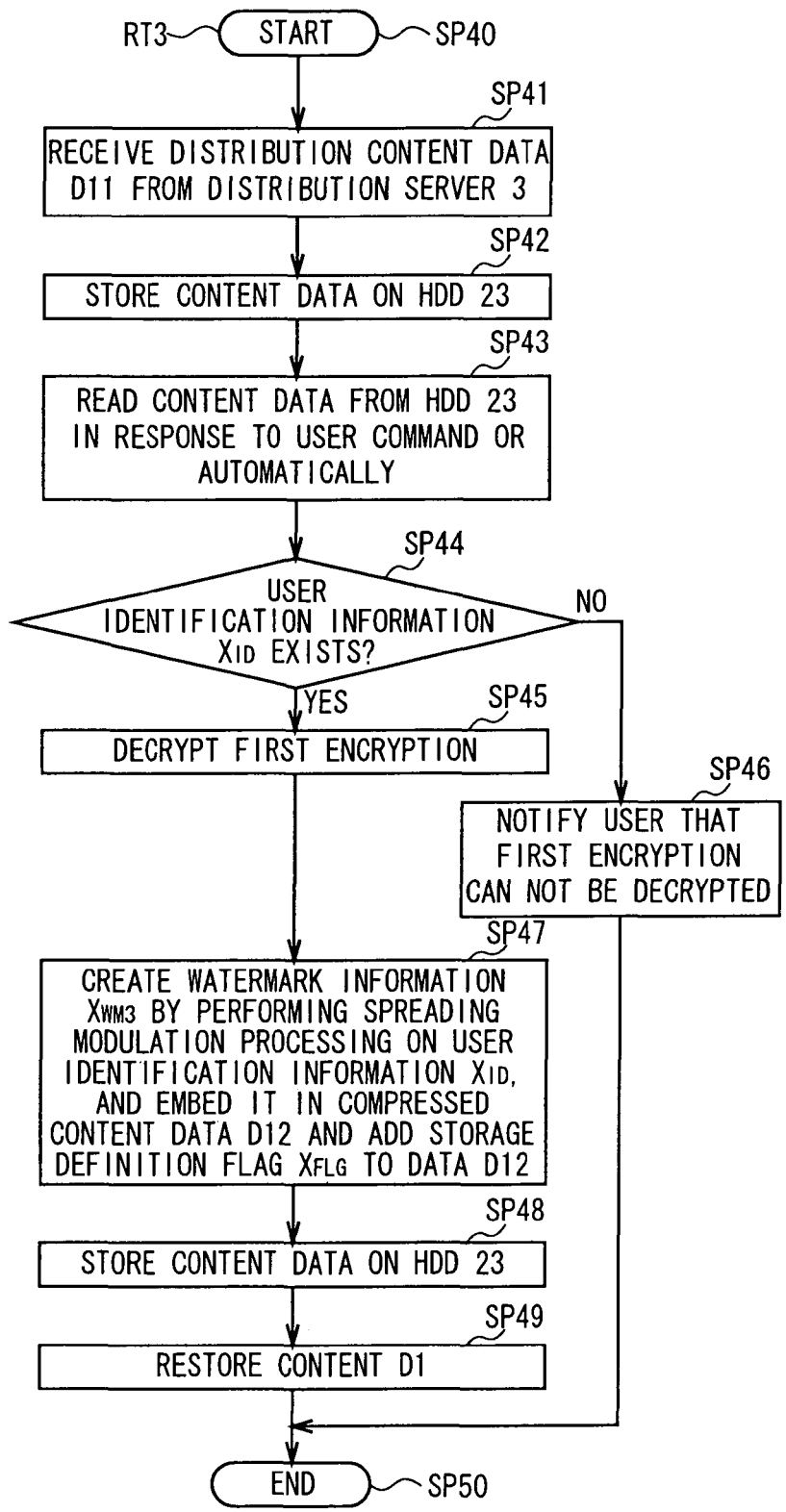
FIG. 11 is a flowchart explaining a content reception processing procedure according to the third embodiment.

The CPU 20 of the personal terminal 60 shown in FIG. 10 carries out a content reception processing procedure RT3 shown in FIG. 11 starting with step SP40. The CPU 20 stores distribution content data D11 sent from the distribution server 52 through the network 5 (FIG. 1), on the HDD 23 via a network interface 24 (steps SP41 and SP42).

Then, in response to a user request or automatically, the CPU 20 of the personal terminal 60 retrieves the corresponding distribution content data D11 from the HDD 23 and sends it to a decryption unit 32 (step SP43).

At this time, the CPU 20 of the personal terminal 60 judges whether the distribution content data D11 includes user identification information $X_{ID}$ (step SP44), and only when the user identification information $X_{ID}$ exists, the decryption unit 32 decrypts the aforementioned first encryption (step SP45).

When it is judged that the distribution content data D11 does not include the user identification information $X_{ID}$, on the contrary, the CPU 20 of the personal terminal 60 displays a message on the display 27 via an image processor 28 to let the user know that the first encryption is not allowed to be decrypted (step SP46).

After the first encryption is decrypted, the decryption unit 32 sends the compressed content data D12 to the flag detector 61 and an embedding unit 56. The flag detector 61 extracts the storage definition flag $X_{FLG}$ from the compressed content data D12 and sends it to the embedding unit 56.

The CPU 20 of the personal terminal 60 retrieves from a RAM 22 the user identification information $X_{ID}$ assigned to the personal terminal 60, and controls a spreading modulation unit 55 to perform spreading modulation on the information $X_{ID}$ and send the resultant as watermark information $X_{WM3}$ to the embedding unit 56.

The CPU 20 of the personal terminal 60 controls the embedding unit 56 to embed the watermark information $X_{WM3}$ and the storage definition flag $X_{FLG}$ in the compressed content data D12 to thereby generate synthesized compressed content data D15 (step SP47).

Specifically, the synthesized compressed content data D15 is generated by embedding the watermark information $X_{WM3}$ in the content with the aforementioned digital watermark technique and recording the storage definition flag $X_{FLG}$ in the header of the data format of audio data composing the content.

Then, the CPU 20 of the personal terminal 60 stores the synthesized compressed content data D15 on the HDD 23 via the recording unit 62 (step SP48). At this time, the CPU 20 of the personal terminal 60 deletes the existing original distribution content data D11 and newly stores the synthesized compressed content data D15 on the HDD 23.

Then, when the user makes a request for the content with the mouse 29 or keyboard 30, the CPU 20 of the personal terminal 60 retrieves and sends the corresponding synthesized compressed content data D15 from the HDD 23 to a decryption/decoding unit 36.

The decryption/decoding unit 36 restores the original content D1 from the synthesized compressed content data D15 (step SP49).

In this way, the CPU 20 of the personal terminal 60 provides the user with the original content D1 by outputting sounds based on the content D1 from the speaker 25 via an audio processor 26.

Note that, although this third embodiment does not specifically described the usage of the storage definition flag, the storage definition flag can be used to judge if content data should be encrypted before being stored.

(3-3) Operation and Effects of Third Embodiment

In this content distribution system having the aforementioned construction, when the distribution server 52 receives an access request from a personal terminal 60, it retrieves the user identification information $X_{ID}$ and the storage definition flag $X_{FLG}$ for the user of the personal terminal 60 and embeds them in the specified content D1 and performs the first encryption on the resultant data in order to thereby generate distribution content data D11, and sends the data D11 to the accessing personal terminal 60 through the network 5.

The personal terminal 60 stores the distribution content data D11 on the HDD 23 once, and then reads out the distribution content data D11 from the HDD 23 as required and decrypts the first encryption on the condition of the existence of the user identification information $X_{ID}$.

Sequentially, the personal terminal 60 extracts the storage definition flag $X_{FLG}$ from the compressed content data D12 subjected to the decryption of the first encryption, and performs spreading modulation on the user identification information $X_{ID}$, stored in the RAM 22, assigned to the personal terminal 60, so as to generate watermark information $X_{WM3}$.

Then, the personal terminal 60 embeds the watermark information $X_{WM3}$ and the storage definition flag $X_{FLG}$ in the compressed content data D12 to thereby generate the synthesized compressed content data D15 which is then stored on the HDD 23.

As described above, when the personal terminal 60 receives content from the distribution server 52 through the network 5, it stores the content on the HDD 23 of the personal terminal 60 once. Then, when the content is retrieved as required, the personal terminal 60 re-stores the content with user identification information $X_{ID}$ embedded in the content as watermark information $X_{WM3}$. As a result, even the content is taken out to the outside from the HDD 23 afterward, the content always carries the user identification information $X_{ID}$, so that it can be judged whether the content was obtained illegally.

According to the aforementioned content distribution system, the distribution server 52 performs the first encryption on content having user identification information $X_{ID}$ and a storage definition flag $X_{FLG}$ embedded therein and sends the resultant to the accessing personal terminal 60 through the network, and the personal terminal 60 stores the received content on the HDD 23 once and when the content is retrieved as required, the personal terminal 60 decrypts the first encryption on the condition of the existence of the user identification information $X_{ID}$ and then re-stores the content with the user identification information $X_{ID}$ embedded therein as watermark information $X_{WM3}$. Therefore, even the content is taken out to the outside from the HDD 23 afterward, the content always carries the user identification information $X_{ID}$, so that even the user having the content distributes the content over the network illegally, the distributor of the content can be found with sure, thus making it possible to realize the content distribution system capable of effectively preventing disadvantages of users who formally bought content.

(4) Warning by Management Server in First to Third Embodiments (4-1) Processing for Managing Content Sent from Users In the aforementioned first to third embodiments, the management server 4 shown in FIG. 4 obtains content sent from each personal terminal 2, by monitoring the network 5, judges if the distributor of the content is the personal terminal 2 of a user formally registered, and sends a notification or warning depending on the judged result to the personal terminal which sent the content.

Figure 12:
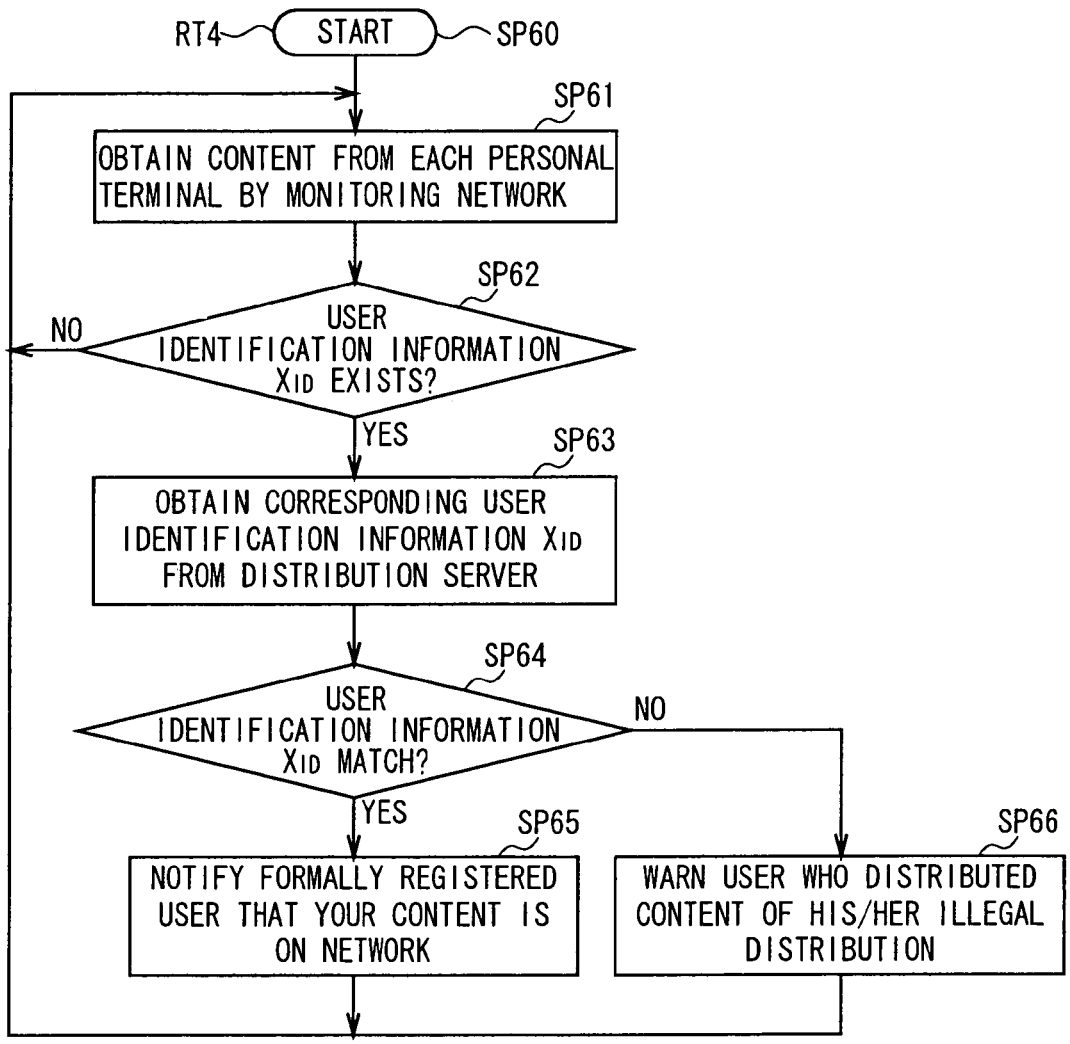
FIG. 12 is a flowchart explaining a management processing procedure for content from users according to the first to third embodiments.

In actual, the CPU 40 of the management server 4 carries out a content management processing procedure RT4 shown in FIG. 12 starting with step SP60, and proceeds to next step SP61 where it obtains content (content distribution data) sent from each personal terminal via the network 5.

In step SP62, the CPU 40 of the management server 4 judges whether the obtained content (content distribution data) has user identification information $X_{ID}$, and proceeds to step SP63 only when the user identification information $X_{ID}$ exists. In step SP63, the CPU 40 obtains the user identification information $X_{ID}$ assigned to the personal terminal which sent the content, from the distribution server through the network 5.

The CPU 40 of the management server 4 proceeds to step SP64 where it judges with the illegal content detector 46 whether the user identification information $X_{ID}$, extracted from the content (content distribution data) matches the user identification information $X_{ID}$ obtained from the distribution server.

An affirmative result in step SP64 means that the personal terminal which is the distributor of the content belongs to a user formally registered for the distribution of the content. In this case, the CPU 40 of the management server 4 proceeds to step SP65 where the illegal content detector 46 sends such a notification that, for example, "your content is on the network", to the personal terminal of the user formally registered, through the network.

Then, the CPU 40 of the management server 4 returns back to step SP61 and repeats the aforementioned processing to detect illegal content on the network.

A negative result in step SP64, on the contrary, means that the personal terminal which is the distributor of the content does not belong to a user formally registered for the distribution of the content. In this case, the CPU 40 of the management server 4 proceeds to step SP66 where the illegal content detector 46 sends such a warning that, for example, "you distributed another person's content illegally and may be punished for this copyright-illegal act", to the personal terminal which distributed the content, through the network.

Then, the CPU 40 of the management server 4 returns back to step SP61 and repeats the aforementioned processing to detect illegal content on the network.

As described above, the management server 4 always monitors the network 5 to detect content distributed from the personal terminals 2 and if it detects the content on the network 5, it makes a prescribed notification or warning to the personal terminal 2 which distributed the content, to let the distributor of the content know about the notification or warning, thus making it possible to previously prevent the infringement of copyright of the content on the network 5.

(4-2) Processing for Managing Content in File Sharing

In the aforementioned first to third embodiments, the management server 4 shown in FIG. 4 obtains content sent from each personal terminal by monitoring the network 5, detects whether the distributor of the content is the personal terminal of a user formally registered, and sends a notification or warning to the personal terminal which distributed the content depending on the detected result.

Figure 13:
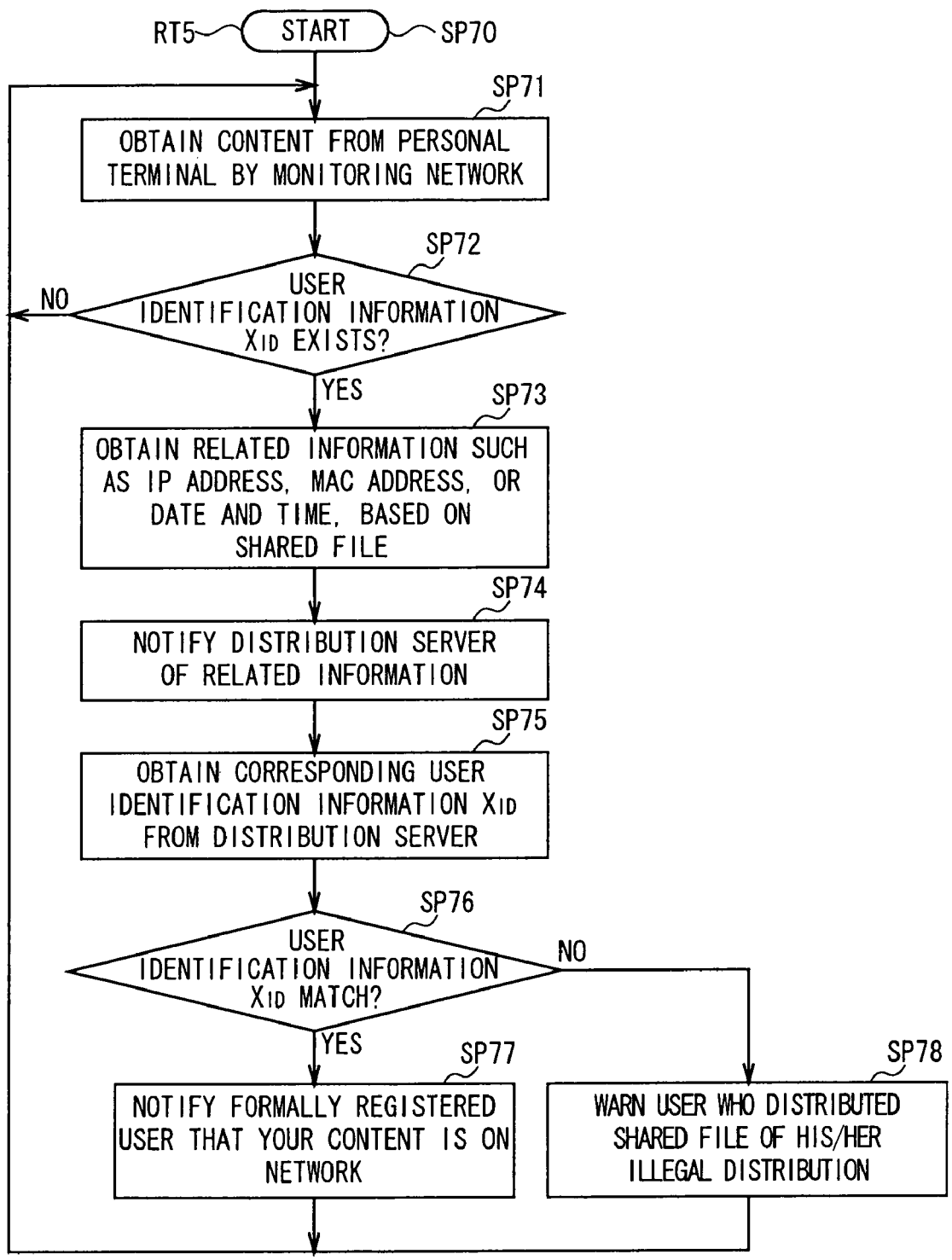
FIG. 13 is a flowchart explaining a management processing procedure for content based on file sharing according to the first to third embodiments.

In actual, the CPU 40 of the management server 4 carries out a content management processing procedure RT5 shown in FIG. 13 starting with step SP70, and proceeds to step SP71 where it uses file sharing software to obtain content (content distribution data) sent from each personal terminal through the network 5.

The CPU 40 of the management server 4 judges in step SP72 whether the obtained content (content distribution data) carries user identification information $X_{ID}$, and only when the user identification information $X_{ID}$ exists, it proceeds to step SP73 where it obtains related information such as IP address, MAC address and date and time, based on the shared file, from the obtained content, and proceeds to step, SP74 to send the related information to the distribution server through the network 5.

The CPU 40 of the management server 4 proceeds to step SP75 to obtain the user identification information $X_{ID}$ assigned to the personal terminal which is the distributor of the content, from the distribution server through the network 5, proceeds to step SP76 where the illegal content detector 46 judges whether the obtained user identification information. $X_{ID}$ matches the user identification information $X_{ID}$ extracted from the content (content distribution data).

An affirmative result in this step SP76 means that the personal terminal which is the distributor of the content belongs to a user formally registered for the distribution of the content, and in this case, the CPU 40 of the management server 4 proceeds to step SP77 to send notification data indicating that, for example, "your content is on the network", to the personal terminal of the user formally registered through the network 5.

Then, the CPU 40 of the management server 4 returns back to step SP71 and repeats the aforementioned processing to detect illegal content by monitoring the network 5.

A negative result in step SP76, on the contrary, means that the personal terminal which is the distributor of the content does not belong to a user formally registered for the distribution of the content. In this case, the CPU 40 of the management server 4 proceeds to step SP78 where the illegal content detector 46 sends warning data indicating that, for example, "you distributed another person's content illegally and may be punished for the copyright infringing act" to the personal terminal which distributed the content over the network 5.

Then, the CPU 40 of the management server 4 returns back to step SP71 and repeats the aforementioned processing to detect illegal content by monitoring the network 5.

As described above, the management server 4 manages content distributed from the personal terminals by monitoring the network 5, and when it detects content distributed over the network, it sends a prescribed notification or warning to the personal terminal of the user providing a shared file which distributed the content, to let the distributor of the content know about the notification or warning, thus making it possible to previously prevent the infringing of the content distributed over the network 5.

(5) Other Embodiments

Note that, in the first to third embodiments, this invention is applied to the content distribution systems 1, 50 composed of personal terminals (terminal devices) 2, 51, 60 and a distribution server 3, 52, shown in FIG. 1 and FIG. 6. This invention, however, is not limited to this and is widely applied to a content distribution system having another construction.

Further, in the first to third embodiments, the personal terminals (terminal devices) 2, 51, 60 and the distribution server 3, 52 are connected to each other via the network 5 such as the Internet. This invention, however, is not limited to this and widely uses not only a wired communication network such as public circuits or Local Area Network (LAN) but also a radio communication network.

Still further, the distribution server 3, 52 can send content via package media (existing media) to a personal terminal (terminal device) 2, 51, 60, not via a network. In this case, a user has to register unique user identification information as identification to the distribution server so that the distribution server can control it, when he/she buys the personal terminal, when he/she buys the media, or before he/she uses the content. At this time, the distribution server can encrypt the user identification information if necessary, so as to have the user perform user identification when he/she uses the content.

Still further, in the first and second embodiments, the distribution server 3, 52 sends content after performing encryption (first encryption), and the personal terminal (terminal device) 2, 51 decrypts the encryption (first encryption) of the content on the condition of the existence of user identification information $X_{ID}$, and only when the user identification information $X_{ID}$ is valid, it stores the content on the HDD (storage means) 23, after or without performing the second encryption depending on the state of the storage definition flag $X_{FLG}$. This invention, however, is not limited to this, and after the personal terminal (terminal device) 2, 51 judges based on the user identification information $X_{ID}$ and/or the storage definition flag $X_{FLG}$ whether to decrypting the encryption (first encryption) of the content received from the distribution server 3, 52, it can store the content subjected to the encryption or the decrypted content on the HDD (storage means) 23 depending on the judged result.

Still further, the aforementioned first and second embodiments have described a case where the personal terminal (terminal device) 2, 51 uses a storage definition flag $X_{FLG}$ embedded in the content by the distribution server 3, 52 to judge whether to encrypt content before storing it. This invention, however, is not limited to this and this judgement whether to encrypt content can be determined by a user having the personal terminal (terminal device) 2, 51, or a combination of both can be used. In this case, the encryption of content can be set for each user and/or each content.

Still further, the aforementioned first to third embodiments have described a case where the distribution server 3, 52 or the personal terminal (terminal device) 2, 51, 60 converts user identification information $X_{ID}$ into watermark information through spreading modulation such as spread spectrum modulation. This invention, however, is not limited to this and an encryption technique such as Steganograpy can be used, provided that copyright information can be embedded in content.

Still further, the aforementioned first to third embodiments have described a case where a user ID assigned to a user having a personal terminal (terminal device) 2, 51, 60 is applied as user identification information $X_{ID}$ which is registered in the distribution server 3, 52. This invention, however, is not limited to this and an IP address expressed by the internet protocol version such as IPv6 (internet protocol version 6) or IPv4 (internet protocol version 4), password, name of provider, or e-mail address, or ID or certification number issued by a public organization or the like, or date and time, country name, name of terminal device, serial number when produced, device ID, or the like can be widely used.

Still further, in the aforementioned first to third embodiments have described a case where the management server 4 is provided on the network 5 for, when user identification information $X_{ID}$ is detected from content by checking the content distributed from a personal terminal (terminal devices) 2, 51, 60, making a prescribed notification or warning to the personal terminal (terminal device) 2, 51, 60 depending on whether the user identification information $X_{ID}$ matches the user identification information $X_{ID}$ uniquely assigned to the personal terminal (terminal device) 2, 51, 60. This invention, however, is not limited to this and a management server having another construction can be widely used, provided that it can make a notification or warning to a user who distributed content over the network.

Still further, the first embodiment has described a case where a content distribution system 1 is composed by connecting a distribution server 3 and a terminal device 2 through a network 5, the distribution server 3 comprising an embedding unit 18, a spreading modulation unit 19 (embedding means) for converting user identification information $X_{ID}$ uniquely assigned to the terminal device 2 and a storage definition flag $X_{FLG}$ of which the state is preset on the terminal device 2 side into watermark information $X_{WM1}$ through prescribed spreading modulation and then embedding the watermark information $X_{WM1}$ in content, an encryption unit (encryption means) 17 for performing prescribed encryption on the content having the watermark information $X_{WM1}$ embedded therein, and a transmission means 14 for transmitting the encrypted content to the terminal device 2 through the network 5, and the terminal device 2 comprising a network interface (receiving means) 24 for receiving the content, an ID•flag detector (extracting means) 34 for extracting the user identification information $X_{ID}$ and the storage definition flag $X_{FLG}$ from watermark information $X_{WM1}$ embedded in the content, through prescribed processing, a decryption unit (decryption means) 32 for decrypting the encryption of the content depending on the existence of the user identification information $X_{ID}$, the CPU (judgement means) 20 for judging based on the state of the storage definition flag $X_{FLG}$ whether the decrypted content should be encrypted before being stored, and an HDD (storage means) 23 for storing the content having the watermark information $X_{WM1}$ embedded therein. This invention, however, is not limited to this and another kind of distribution server and terminal device can be widely applied, provided that the distribution server 3 can send to the personal terminal (terminal device) 2 content with user identification information $X_{ID}$ and a storage definition flag $X_{FLG}$, set by the personal terminal (terminal device) 2, embedded in the content as watermark information $X_{WM1}$.

Still further, user identification information $X_{ID}$ and a storage definition flag $X_{FLG}$ can be added to content as flag information as they are, without converting them into watermark information through spreading modulation. In addition, in a case of encrypted content, since security is secured, the personal terminal (terminal device) can extract this flag information only, without detecting watermark information.

Still further, in the aforementioned second embodiment, the distribution server 52 adds to content user identification information $X_{ID}$ uniquely assigned to a personal terminal (terminal device) 51 and a storage definition flag $X_{FLG}$ of which the state is preset on the terminal device side, and the personal terminal (terminal device) 51 extracts the user identification information $X_{ID}$ and the storage definition flag $X_{FLG}$ from the received content, decrypts the encryption of the content depending on the existence of the user identification information $X_{ID}$, and judges based on the validly of the user identification information $X_{ID}$ if the terminal should convert the user identification information $X_{ID}$ into watermark information $X_{WM2}$ through prescribed spreading modulation and then embed the watermark information $X_{WM2}$ in the content. Then, the personal terminal 51 judges based on the state of the storage definition flag $X_{FLG}$ whether the decrypted content should be encrypted before being stored, and stores the content having the watermark information $X_{WM2}$ embedded therein, after or without encryption depending on the judged result. This invention, however, is not limited to this and another kind of distribution server and terminal device can be widely applied, provided that the personal terminal (terminal device) 51 can embed user identification information $X_{ID}$ in content as watermark information $X_{WM2}$.

Still further, the aforementioned third embodiment has described a case where the distribution server 52 adds to content user identification information $X_{ID}$ uniquely assigned to the personal terminal (terminal device) 60 and a storage definition flag $X_{FLG}$ of which the state is preset on the terminal device side, and the personal terminal (terminal device) 60 receives and stores the content on the HDD (storage means) 23, and when it reads the content from the HDD (storage means) 23 as required, extracts the user identification information $X_{ID}$ and the storage definition flag $X_{FLG}$ from the content, decrypts the encryption of the content depending on the existence of the user identification information $X_{ID}$, converts the user identification information $X_{ID}$ into watermark information $X_{WM3}$ through prescribed spreading modulation and then embeds the watermark information $X_{WM3}$ in the decrypted content. Then, the personal terminal (terminal device) 60 stores the content having the watermark information $X_{WM3}$ embedded therein on the HDD (storage means) 23. This invention, however, is not limited to this and another kind of distribution server and terminal device can be widely applied, provided that the personal terminal (terminal device) 60 can embed user identification information $X_{ID}$ in content as watermark information $X_{WM3}$ before or after the content is stored on the HDD (storage means) 23.

As described above, according to the present invention, in a content distribution system formed by connecting a distribution server and a terminal device through the network, the distribution server comprises an embedding means for converting user identification information uniquely assigned to the terminal device and a storage definition flag of which the state is preset on the terminal device side, into watermark information through prescribed spreading modulation and then embedding the watermark information in content, an encryption means for performing prescribed encryption on the content having the watermark information embedded therein, and a transmitting means for transmitting the encrypted content to the terminal device through the network, and the terminal device comprises a reception means for receiving the content, an extraction means for extracting the user identification information and the storage definition flag by performing prescribed processing on the watermark information embedded in the content, a decryption means for decrypting the encryption of the content depending on the existence of the user identification information, a judgement means for judging based on the state of the storage definition flag whether the decrypted content should be encrypted before being stored, and a storage means for storing the content having watermark information embedded therein. Thereby, even the content is taken out from the storage means of the terminal device to the outside afterward, the content always carries the user identification information, so that even the user having the content distributes the content over the network illegally, the distributor of the content can be found with sure, thus making it possible to realize a content distribution system capable of effectively preventing disadvantages of users who formally bought content.

Still further, in a content distribution method of a content distribution system in which a distribution server and a terminal device are connected through a network, the distribution server comprises a first step of converting user identification information uniquely assigned to the terminal device and a storage definition flag of which the state is preset on the terminal device side, into watermark information through prescribed spreading modulation, and then embedding the watermark information in content, a second step of performing prescribed encryption on the content having the watermark information embedded therein, and a third step of sending the encrypted content to the terminal device through the network, and the terminal device comprises a fourth step of receiving the content, the fifth step of extracting the user identification information and the storage definition flag by performing prescribed processing on the watermark information embedded in the content, a sixth step of decrypting the encryption of the content depending on the existence of the user identification information, a seventh step of judging based on the state of the storage definition flag whether the decrypted content should be encrypted before being stored, and an eighth step of storing the content having watermark information embedded therein. Thereby, even the content is taken out from the storage means to the outside afterward, the content always carries the user identification information, so that even the user having the content distributes the content over the network illegally, the distributor of the content can be found with sure, thus making it possible to realize a content distribution method capable of effectively preventing disadvantages of users who formally bought content.

Still further, a content distribution method of a content distribution system in which a distribution server and a terminal device are connected through a network, the distribution server comprises a first step of adding to content user identification information uniquely assigned to the terminal device and a storage definition flag of which the state is preset on the terminal device side, a second step of performing prescribed encryption on the content having the user identification information and the storage definition flag added thereto, and a third step of transmitting the encrypted content to the terminal device through the network, and the terminal device comprises a fourth step of receiving the content, the fifth step of extracting the user identification information and the storage definition flag from the content, a sixth step of decrypting the encryption of the content depending on the existence of the user identification information, a seventh step of judging based on the validly of the user identification information whether the user identification information should be converted into watermark information through prescribed spreading modulation and the watermark information should be embedded in the content, an eighth step of judging based on the state of the storage definition flag whether the decrypted content should be encrypted before being stored, and a ninth step of storing the content having the watermark information embedded therein. Thereby, even the content is taken out from the storage means of the terminal device to the outside afterward, the content always carries the user identification information, so that even the user having the content distributes the content over the network illegally, the distributor of the content can be found with sure, thus making it possible to realize a content distribution method capable of effectively preventing disadvantages of users who formally bought content.

Still further, in a content distribution method of a content distribution system where a distribution server and a terminal device are connected through a network, the distribution server comprises a first step of adding to content user identification information uniquely assigned the terminal device and a storage definition flag of the state is preset on the terminal device side, a second step of performing prescribed encryption on the content having the user identification information and storage definition flag added thereto, and a third step of sending the encrypted content to the terminal device through the network, and the terminal device comprises a fourth step of receiving and storing the content in a prescribed storage means, a fifth step of, when the content is retrieved from the storage means as required, extracting the user identification information and the storage definition flag from the content, a sixth step of decrypting the encryption of the content depending on the existence of the user identification information, a seventh step of converting the user identification information into watermark information through prescribed spreading modulation and embedding the watermark information into the decrypted content, and an eighth step of storing the content having the watermark information embedded therein in the storage means. Thereby, even the content is taken out from the storage means of the terminal device to the outside afterward, the content always carries the user identification information, so that even the user having the content distributes the content over the network illegally, the distributor of the content can be found with sure, thus making it possible to realize a content distribution method capable of effectively preventing disadvantages of users who formally bought content.

Still further, the terminal device for managing content comprises an extraction means for, when watermark information generated by performing prescribed spreading modulation on user identification information uniquely assigned to the terminal device and the storage definition flag of which the state is preset on the terminal device side is embedded in content, performing prescribed processing on the watermark information embedded in the content in order to extract the user identification information and the storage definition flag, a decryption means for, in a case where the content has been encrypted, decrypting the encryption of the content depending on the existence of the user identification information, a judgement means for judging based on the storage definition flag whether the decrypted content should be encrypted before being stored, and a storage means for storing the content having the watermark information embedded therein. Thereby, even the content is taken out from the storage means to the outside afterward, the content always carries the user identification information, so that even the user having the content distributes the content over the network illegally, the distributor of the content can be found with sure, thus making it possible to realize a terminal device capable of effectively preventing disadvantages of users who formally bought content.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A content distribution system including a distribution server and a terminal device connected through a network, wherein said distribution server comprises:
    embedding means for converting user identification information and a storage definition flag into watermark information through spreading modulation and embedding the watermark information in content, the user identification information uniquely assigned to said terminal device, the storage definition flag having a state previously set on said terminal device side;
    encryption means for encrypting said content having said watermark information embedded therein; and
    transmitting means for transmitting said encrypted content to said terminal device through said network, and said terminal device comprises:
    reception means for receiving said content;
    extraction means for extracting said user identification information and said storage definition flag from said watermark information embedded in said content;
    decryption means for decrypting said encrypted content depending on the existence of said user identification information;
    judgment means for judging, based on the state of said storage definition flag, whether said decrypted content should be encrypted before being stored; and
    storage means for storing said content having said watermark information embedded therein.

2. The content distribution system according to claim 1, further comprising a management server provided on said network for sending a notification or warning to said terminal device when content distributed from said terminal device is detected and said user identification information is detected from the content.

3. The content distribution system according to claim 2, wherein said management server sends said notification or warning to said terminal device depending on whether said detected user identification information matches the user identification information uniquely assigned to said terminal device.

4. A content distribution method in a content distribution system including a distribution server and a terminal device connected through the network, wherein said distribution server executes steps including:
    converting user identification information and a storage definition flag into watermark information through spreading modulation and embedding said watermark information in content, the user identification information uniquely assigned to said terminal device, the storage definition flag having a state previously set on said terminal device side;
    encrypting said content having said watermark information embedded therein; and
    transmitting said encrypted content to said terminal device through said network, and
    said terminal device executes steps including:
    receiving said content;
    extracting said user identification information and said storage definition flag from said watermark information embedded in said content;
    decrypting said encrypted content depending on the existence of said user identification information;
    judging, based on the state of said storage definition flag, whether said decrypted content should be encrypted before being stored; and
    storing said content having said watermark information embedded therein.

5. The content distribution method according to claim 4, further comprising sending a notification or warning to said terminal device when content distributed from the terminal device over said network is detected and said user identification information is detected from the content.

6. The content distribution method according to claim 5, wherein said notification or said warning is sent to said terminal device depending on whether said detected user identification information matches the user identification information uniquely assigned to said terminal device.

7. A content distribution method in a content distribution system including a distribution server and a terminal device connected through a network, wherein said distribution server executes steps including:
- adding user identification information and a storage definition flag to content, the user identification information being uniquely assigned to said terminal device, the storage definition flag having a state previously set on said terminal device side;
- encrypting said content having said user identification information and said storage definition flag added thereto; and
- transmitting said encrypted content to said terminal device through said network, and said terminal device executes steps including:
- receiving said content;
- extracting said user identification information and said storage definition flag from said content;
- decrypting said encrypted content depending on the existence of said user identification information;
- judging, based on the validity of said user identification information, whether said user identification information should be converted into watermark information through spreading modulation and then the watermark information should be embedded in said content;
- judging, based on the state of said storage definition flag, whether said decrypted content should be encrypted before being stored; and
- storing said content having said watermark information embedded therein.

8. A content distribution method in a content distribution system including a distribution server and a terminal device connected through a network, wherein said distribution server executes steps including:
- adding user identification information and a storage definition flag to content, the user identification information being uniquely assigned to said terminal device, the storage definition flag having a state previously set on said terminal device side;
- encrypting said content having said user identification information and said storage definition flag added thereto; and
- transmitting said encrypted content to said terminal device through said network, and said terminal device executes steps including:
- receiving and storing said content in a storage means;
- extracting said user identification information and said storage definition flag from the content when said content is read from said storage means;
- decrypting said encrypted content depending on the existence of said user identification information;
- converting said user identification information into watermark information through spreading modulation and embedding the watermark information in said decrypted content; and
- storing said content having said watermark information embedded therein, in said storage means;
- wherein the storage definition flag is used to determine whether said content should be encrypted before being stored.

9. A terminal device for managing content, comprising:
- extraction means for, when watermark information generated by performing spreading modulation on user identification information and a storage definition flag is embedded in content, extracting said user identification information and said storage definition flag from said watermark information embedded in said content, the user identification information being uniquely assigned to said terminal device, the storage definition flag having a state previously set on said terminal device side;
- decryption means for, when said content has been encrypted, decrypting the encrypted content depending on the existence of said user identification information;
- judgment means for judging, based on the state of said storage definition flag, whether said decrypted content should be encrypted before being stored; and
- storage means for storing said content having said watermark information embedded therein.

* * * * *